(12) United States Patent (10) Patent No.: US 9,342,108 B2
Rothkopf et al. (45) Date of Patent: May 17, 2016

(54) PROTECTING AN ELECTRONIC DEVICE

(75) Inventors: Fletcher Rothkopf, Los Altos, CA (US);
Colin M. Ely, Cupertino, CA (US);
Stephen B. Lynch, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 229 days.

(21) Appl. No.: 13/437,903

(22) Filed: Apr. 2, 2012

(65) Prior Publication Data

US 2013/0257582 A1 Oct. 3, 2013

(51) Int. Cl.
*G06F 1/16* (2006.01)
*H04M 1/18* (2006.01)

(52) U.S. Cl.
CPC ............ *G06F 1/1656* (2013.01); *G06F 1/1626* (2013.01); *G06F 1/1694* (2013.01); *G06F 2200/1633* (2013.01); *H04M 1/185* (2013.01); *H04M 2250/12* (2013.01)

(58) Field of Classification Search
None
See application file for complete search history.

(56) References Cited

U.S. PATENT DOCUMENTS

| | | |
|---|---|---|
| 2,171,808 A | 9/1939 | Von Schlippe |
| 2,989,869 A | 6/1961 | Hanggi |
| 3,606,296 A | 9/1971 | Chassagne |
| 3,772,923 A | 11/1973 | Burt |
| 3,919,575 A | 11/1975 | Weber et al. |
| 4,278,726 A | 7/1981 | Wieme |
| 4,288,051 A * | 9/1981 | Goschel .................. 244/164 |
| 4,314,735 A | 2/1982 | Fullenkamp et al. |
| 4,370,894 A | 2/1983 | Sturesson |
| 4,849,580 A | 7/1989 | Reuter |
| 4,940,336 A | 7/1990 | Dryga et al. |
| 5,182,158 A | 1/1993 | Schaeffer |
| 5,349,893 A | 9/1994 | Dunn |
| 5,368,914 A | 11/1994 | Barrett |
| 5,426,562 A | 6/1995 | Morehouse et al. |
| 5,507,665 A | 4/1996 | Oda |
| 5,587,854 A | 12/1996 | Sato et al. |
| 5,606,341 A | 2/1997 | Aguilera |
| 5,659,376 A | 8/1997 | Uehara et al. |
| 5,666,261 A | 9/1997 | Aguilera |
| 5,783,297 A | 7/1998 | Wise et al. |
| 5,909,074 A | 6/1999 | Takaya et al. |
| 5,936,600 A | 8/1999 | Ohashi et al. |

(Continued)

FOREIGN PATENT DOCUMENTS

| | | |
|---|---|---|
| CN | 1458804 | 11/2003 |
| CN | 2710238 | 7/2005 |

(Continued)

OTHER PUBLICATIONS

International Search Report and Written Opinion, PCT/US2013/034476, 12 pages, Jul. 8, 2013.

*Primary Examiner* — Firmin Backer
*Assistant Examiner* — Brian Wilson
(74) *Attorney, Agent, or Firm* — Brownstein Hyatt Farber Schreck, LLP

(57) ABSTRACT

An electronic device including a processor, at least one sensor in communication with the processor, wherein the processor is configured to determine an orientation of the device and drop event based on input from the at least one sensor. The electronic device further includes a motor in communication with the processor and a mass operably connected to the motor. The processor is configured to drive the motor when a drop event is determined and the mass is configured to rotate with respect to the motor to alter the orientation of the device.

34 Claims, 29 Drawing Sheets

(56) References Cited

U.S. PATENT DOCUMENTS

| | | |
|---|---|---|
| 5,965,249 A | 10/1999 | Sutton et al. |
| 5,982,617 A | 11/1999 | Haley et al. |
| 6,154,360 A | 11/2000 | Kaczeus et al. |
| 6,262,888 B1 | 7/2001 | Siedow et al. |
| 6,288,489 B1 | 9/2001 | Isohata et al. |
| 6,323,757 B1 | 11/2001 | Nagai |
| 6,324,054 B1 | 11/2001 | Chee et al. |
| 6,373,702 B2 | 4/2002 | Oishi et al. |
| 6,483,926 B1 | 11/2002 | Yamashita et al. |
| 6,524,692 B1 | 2/2003 | Rosen |
| 6,596,976 B2 | 7/2003 | Lin et al. |
| 6,603,620 B1 | 8/2003 | Berding |
| 6,627,818 B2 | 9/2003 | Kamel et al. |
| 6,633,481 B2 | 10/2003 | Pavol |
| 6,647,328 B2 | 11/2003 | Walker |
| 6,664,491 B2 | 12/2003 | Yanai et al. |
| 6,665,192 B2 | 12/2003 | Wimberger Friedl et al. |
| 6,744,186 B2 | 6/2004 | Oishi et al. |
| 6,809,916 B2 | 10/2004 | Nakata et al. |
| 6,859,357 B2 | 2/2005 | Morimoto et al. |
| 6,924,996 B2 | 8/2005 | Sugawara |
| 6,968,954 B2 | 11/2005 | Hsieh |
| 7,009,835 B2 | 3/2006 | Desai et al. |
| 7,059,182 B1 | 6/2006 | Ragner |
| 7,064,655 B2 | 6/2006 | Murray et al. |
| 7,094,094 B2 | 8/2006 | Zahnen et al. |
| 7,113,351 B2 | 9/2006 | Hovanky |
| 7,133,281 B2 | 11/2006 | Bae |
| 7,161,580 B2 | 1/2007 | Bailey et al. |
| 7,167,360 B2 | 1/2007 | Inoue et al. |
| 7,259,357 B2 | 8/2007 | Walker |
| 7,260,885 B2 | 8/2007 | Albrecht et al. |
| 7,354,315 B2 | 4/2008 | Goetz et al. |
| 7,369,345 B1 | 5/2008 | Li et al. |
| 7,373,863 B2 | 5/2008 | O'Banion et al. |
| 7,375,645 B2 | 5/2008 | Tsai |
| 7,382,567 B2 | 6/2008 | Liao et al. |
| 7,393,575 B2 | 7/2008 | Boss |
| 7,450,332 B2 | 11/2008 | Pasolini et al. |
| 7,463,436 B2 | 12/2008 | Takahashi et al. |
| 7,477,469 B2 | 1/2009 | Cook et al. |
| 7,492,544 B2 | 2/2009 | Jeansonne et al. |
| 7,532,478 B2 | 5/2009 | Jeong |
| 7,554,798 B2 | 6/2009 | Tanokuchi et al. |
| 7,568,942 B1 | 8/2009 | Lannon et al. |
| 7,578,691 B2 | 8/2009 | Weksler et al. |
| 7,612,994 B2 | 11/2009 | Ulrich et al. |
| 7,619,891 B2 | 11/2009 | Woo et al. |
| 7,643,243 B2 | 1/2010 | Lee et al. |
| 7,652,892 B2 | 1/2010 | Shiu et al. |
| 7,660,107 B2 | 2/2010 | Leung |
| 7,684,183 B2 | 3/2010 | Mori et al. |
| 7,760,289 B2 | 7/2010 | Nakanishi et al. |
| 7,817,373 B2 | 10/2010 | Choi et al. |
| 7,839,051 B2 | 11/2010 | Klinghult |
| 7,855,892 B2 | 12/2010 | Lin |
| 7,924,552 B2 | 4/2011 | Tseng |
| 8,044,818 B2 | 10/2011 | Tysowski et al. |
| 8,075,981 B2 | 12/2011 | Pearce et al. |
| 8,093,811 B2 | 1/2012 | Tanokuchi et al. |
| 8,106,789 B2 | 1/2012 | Yang et al. |
| 8,144,453 B2 | 3/2012 | Brown et al. |
| 8,189,280 B2 | 5/2012 | Ollila et al. |
| 8,190,015 B2 | 5/2012 | Lin et al. |
| 8,248,777 B2 | 8/2012 | Prest |
| 8,275,420 B2 | 9/2012 | Lim |
| 8,289,689 B2 | 10/2012 | Chen et al. |
| 8,289,715 B2 | 10/2012 | Takahara |
| 8,305,744 B2 | 11/2012 | Shedletsky et al. |
| 8,330,305 B2 | 12/2012 | Hart et al. |
| 8,411,432 B1 | 4/2013 | Zimlin et al. |
| 8,421,763 B2 | 4/2013 | Liao |
| 8,430,381 B2 | 4/2013 | Chen |
| 8,446,475 B2 | 5/2013 | Topliss et al. |
| 8,467,133 B2 | 6/2013 | Miller |
| 8,564,424 B2 | 10/2013 | Evarts et al. |
| 8,862,182 B2 | 10/2014 | Shukla et al. |
| 8,896,995 B2 | 11/2014 | Shedletsky et al. |
| 8,903,519 B2 | 12/2014 | King et al. |
| 2005/0017396 A1 | 1/2005 | Pearce et al. |
| 2006/0109581 A1 | 5/2006 | Li et al. |
| 2006/0290662 A1* | 12/2006 | Houston et al. ............... 345/156 |
| 2008/0024972 A1 | 1/2008 | Yamaguchi |
| 2008/0055248 A1* | 3/2008 | Tremblay ................ G06F 3/011 345/158 |
| 2008/0091309 A1 | 4/2008 | Walker |
| 2008/0163716 A1 | 7/2008 | Battlogg et al. |
| 2008/0192124 A1 | 8/2008 | Nagasaki |
| 2009/0212130 A1 | 8/2009 | Franklin, Jr. |
| 2009/0273480 A1 | 11/2009 | Mittleman et al. |
| 2010/0149073 A1 | 6/2010 | Chaum et al. |
| 2010/0161131 A1 | 6/2010 | Goswami et al. |
| 2010/0162835 A1 | 7/2010 | Lee et al. |
| 2010/0164152 A1 | 7/2010 | Li |
| 2010/0272969 A1 | 10/2010 | Taylor |
| 2011/0040410 A1* | 2/2011 | Kim ..................... B62D 57/032 700/260 |
| 2011/0132114 A1 | 6/2011 | Siotis |
| 2011/0194230 A1* | 8/2011 | Hart ...................... H04M 1/185 361/437 |
| 2011/0228460 A1 | 9/2011 | Kim et al. |
| 2011/0257765 A1 | 10/2011 | Evans et al. |
| 2011/0310500 A1 | 12/2011 | Osaka et al. |
| 2012/0028577 A1* | 2/2012 | Rodriguez ....... H04N 21/44008 455/41.1 |
| 2012/0212484 A1 | 8/2012 | Haddick et al. |
| 2012/0212499 A1 | 8/2012 | Haddick et al. |
| 2012/0234981 A1* | 9/2012 | Nagabhushan et al. ...... 244/165 |
| 2013/0038278 A1 | 2/2013 | Park et al. |
| 2013/0063885 A1 | 3/2013 | Shedletsky et al. |
| 2013/0073095 A1* | 3/2013 | King et al. ..................... 700/279 |
| 2013/0077278 A1 | 3/2013 | Prest |
| 2013/0100591 A1 | 4/2013 | Montevirgen et al. |
| 2013/0127980 A1 | 5/2013 | Haddick et al. |
| 2013/0278631 A1 | 10/2013 | Border et al. |
| 2013/0285490 A1 | 10/2013 | Rothkopf et al. |
| 2014/0253284 A1 | 9/2014 | Peterson et al. |
| 2014/0260723 A1 | 9/2014 | Ely et al. |
| 2014/0273607 A1 | 9/2014 | Orand et al. |

FOREIGN PATENT DOCUMENTS

| | | |
|---|---|---|
| CN | 2794023 | 7/2006 |
| CN | 201230310 | 4/2009 |
| CN | 102857589 | 1/2013 |
| EP | 1057504 | 12/2000 |
| GB | 715773 | 9/1954 |
| GB | 1133198 | 11/1968 |
| JP | 2011099758 | 5/2011 |
| KR | 2004/036970 * | 5/2004 |
| WO | WO2010/135421 | 11/2010 |

\* cited by examiner

PROTECTING AN ELECTRONIC DEVICE

CROSS-REFERENCE TO RELATED APPLICATIONS

The instant application is related to U.S. patent application Ser. No. 13/234,324, filed Sep. 16, 2011, entitled "Protective Mechanism for an Electronic Device" which is incorporated herein in its entirety and for all purposes.

TECHNICAL FIELD

The present invention relates generally to electronic devices and more specifically, to mobile electronic devices.

BACKGROUND

Mobile electronic devices are being used more often and more people are carrying mobile electronic devices with them on a continuous basis. However, people may drop their mobile electronic devices, or the mobile electronic devices may otherwise be caused to enter a freefall state. For example, if the mobile electronic device may get pushed off of a counter or table. As mobile electronic devices impact a surface after freefall they may be substantially damaged, even if they are encased within a cover or other protective device.

Many portable devices have impact orientations that are less vulnerable than others. That is, there are orientations for the devices that reduce the likelihood of damage based in part upon a particular part of the device that impacts the surface after a fall. For example, smart phones with cover glass may be particularly vulnerable when the cover glass impacts the ground. They may be much less vulnerable if a metal or plastic portion of the housing of the smart phone impacts the ground first or instead. Thus, there are impact orientations that are less vulnerable to damage than others.

SUMMARY

Examples of the disclosure may take the form of an electronic device. An electronic device including a processor, at least one sensor in communication with the processor, wherein the processor is configured to determine an orientation of the device and drop event based on input from the at least one sensor. The electronic device further includes a motor in communication with the processor and a mass operably connected to the motor. The processor is configured to drive the motor when a drop event is determined and the mass is configured to rotate with respect to the motor to alter the orientation of the device.

Other examples of the disclosure may take the form of a method for protecting a vulnerable area of an electronic device during a freefall. The method may include detecting by a sensor a freefall of the device and determining by the sensor an orientation of the device. Then, determining an orientation of the device that would avoid impact at a vulnerable area of the device and operating a motor to alter the angular momentum of the device during the free fall to change the orientation of the device towards the orientation that would avoid impact at the vulnerable area. The method also includes monitoring the effect of the motor's operation and providing a feedback loop to adjust the operation of the motor based on the monitoring step.

SPECIFICATION

Figure 1A:
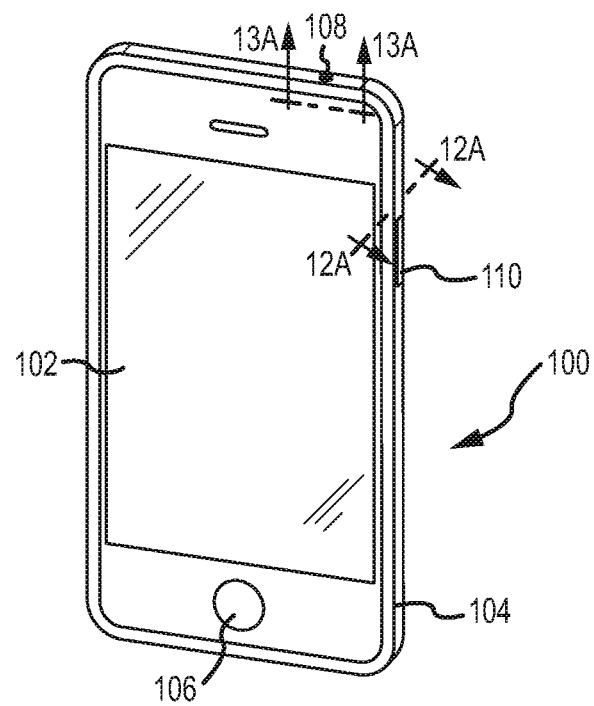
FIG. 1A is an isometric view of a mobile electronic device.

In some embodiments herein, a device protection mechanism is disclosed. The protective mechanism may be activated help protect select components or portions of the electronic device from being damaged due to a fall or drop. When an electronic device impacts a surface, (for example, from a fall) certain portions of electronic devices may be more vulnerable than other portions or components. The protective mechanism may be activated when the device is falling or in a free-fall mode, and may help to protect the device, or certain portions or components of the device.

In one example, the protective mechanism is configured to alter the device orientation as the device is falling. This may allow a less vulnerable portion of the device to impact the surface at the end of a freefall. For example, the protective mechanism may be activated to rotate the device so that it may impact a surface on its edge, rather than on a screen portion. Similarly, the protective mechanism may alter the device orientation by altering the angular momentum of the device. As the angular momentum of the device is altered, the orientation of the device (as it is falling) may be altered. For example, the device may be rotating around a particular rotational axis when it first enters freefall and the protective mechanism may cause the device to rotate around a different rotational axis.

The protective mechanism may alter the angular momentum via a rotating or linearly sliding mass. A rotating mass will change the device's angular momentum around its rotation axis. A translating mass can shift the device's center of mass or change it's moment of inertia, which will change the rate of rotation of the mobile device. For example, a device could fall with no angular momentum and it's cover glass facing the ground. A mass rotating around an axis parallel to the ground will rotate the rest of the device in the opposite direction, so that the cover glass does not impact the ground. As another example, if a device is falling such that it will make one full rotation and its cover glass will hit the ground upon impact, shifting a mass away from the device's center of gravity will slow its rotation, and it might only make one half rotation before impact. Altering the center of mass and/or rotation pattern of the device may help increase the chance that the device may impact a surface in a desired orientation (or at least reduce the chance that the device may impact its most vulnerable area). In yet another example, a propulsion system may be utilized to change a rate of rotation of the device and/or to help slow or stop impact of the device with a surface. The propulsion system may be implemented as a fan, a jet or other suitable propulsion device. The propulsion system may be implemented alone or in combination with another system for changing the angular momentum of the device and/or helping to prevent the device incurring damage.

In some embodiments, a feedback control loop may be implemented to control a motor configured to alter the angular momentum. The feedback control loop may determine that the motor should be driven, stopped or reversed, as well as the speed of the motor. Generally, the feedback loop may include a kinematic system that receives input from one or more sensors or devices configured to provide data for determining metrics related to a fall event. For example, the data may be used to determine a fall height, a gravity vector or other orientation relative to ground, a rate of rotation, a degree of inclination from a plane, and so forth. Further, the data may be used to determine the effectiveness of attempts to alter the angular momentum of the device. The feedback loop may help to achieve a desired impact orientation for the device. In one example, the feedback loop may take the form of a Proportional-Integral-Derivative (PID) controller. In some embodiments, an integral portion of the PID controller may be omitted or both the integral and derivative portions may be omitted. As such, in some embodiments, a Proportional controller may be implemented.

In another example, the protective mechanism may vary the angular momentum and/or orientation of the device during freefall by activating a thrust mechanism. The thrust mechanism may produce a thrust force in one or multiple directions in order to reorient the device. For example, the thrust mechanism may include a gas canister that may deploy the compressed gas outside of the device to change its orientation. In other examples, a fan used for cooling can also redirect air outside the device to provide propulsion, a fuel cell or turbine used for power can redirect exhaust outside the device for propulsion, or a dedicated system such as electric ion propulsion could be used.

In another example, the thrust mechanism may be used immediately before impact to "catch" the device before it makes impact. That is, the thrust mechanism may be used to provide thrust or generate an air cushion between the device and an impact surface instead of or in addition to varying the angular momentum. It should be appreciated that the use of the thrust mechanism in this manner may be in combination with one or more other angular momentum varying technique.

In yet another example, the protective mechanism may activate an airfoil to change the aerodynamics of the mobile electronic device. The airfoil may help to reduce a velocity of the free-fall of the device by producing a lift force, and can also redirect air to reorient the device. In this example, the airfoil may help to reduce the force of impact as the device hits the surface, as the momentum of the device may be reduced (as the velocity of the fall may be reduced).

The protective mechanism may also act to protect the device by altering components in order to attempt to prevent impact with a surface. For example, the protective device may contract the screen, buttons, switches, or the like that may be exposed on an outer surface of the enclosure, so that the buttons or switches may be protected within the enclosure at impact. This may help to prevent the buttons or switches from being damaged, while the enclosure (which may be designed to withstand particular forces), may receive most of the force from impact.

In another example, the protective device may include a gripping member configured to grip onto a power cord, headphone cord, or the like that may be partially received within the device. For example, headphones may be inserted within an audio port and the headphones may be operably connected to a user's head. As the device experiences a freefall (e.g., is dropped by the user), the grip members may expand within the audio port to grip or otherwise retain the headphones (or other plug). This may help to prevent the device from impacting a surface, or may at the least slow down or reduce the velocity at impact, which may give a user a chance to grasp the device.

The electronic device may also store information correlating to various impacts and freefalls of the device. This information may include the drop heights, drop frequency, device orientation prior to the drop, and/or drop velocity. This type of fall or drop information may be stored in order to improve or better protect the device from impacts due to freefalls. For example, the information may be used by the phone to better estimate a predicted freefall orientation and activate a particular protective mechanism or device. In another example, the information may be provided to a device manufacturer so that the device may be constructed to better withstand the most common freefall impacts, such as but not limited to, creating a thicker enclosure on a particular area of the device, relocating particular components within the device, or changing an overall shape of the device.

Figure 2:
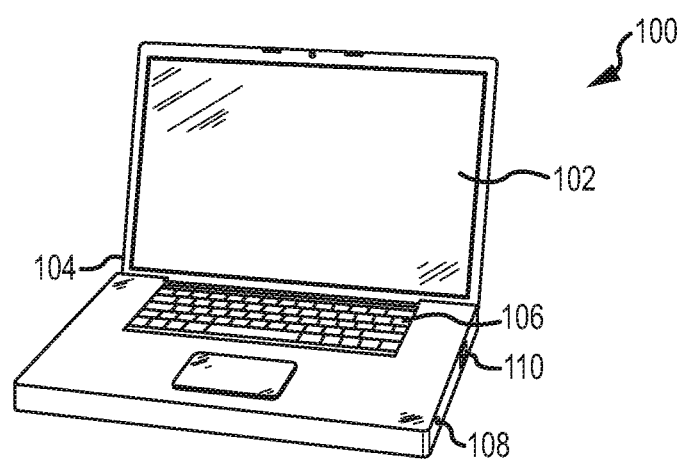
FIG. 2 is an isometric view of another embodiment of the mobile electronic device of FIG. 1.

FIG. 1A is an isometric view of a first example of a mobile electronic device and FIG. 2 is an isometric view of another example of the mobile electronic device. The mobile electronic device 100 may include a protective mechanism to help reduce damage to the device 100 (or select components of the device 100) upon impact from a free-fall. The mobile electronic device 100 may be substantially any type of electronic device, such as a digital music player (e.g., MP3 player), a digital camera, a smart phone (e.g., iPhone by Apple, Inc.), a laptop or tablet computer, and so on. For example, FIG. 2 is a perspective view of a second embodiment of the mobile computing device 100, illustrating the mobile computing device 100 as a laptop. The mobile electronic device 100 may include a display screen 102, an enclosure 104, and an input member 106.

The display screen 102 provides an output for the mobile computing device 100. The display screen 102 may be a liquid crystal display screen, plasma screen, and so on. Additionally, in some embodiments the display screen 102 may function as both an input and an output device. For example, the display screen 102 may include a capacitive input sensor so that a user may provide input signals to the mobile computing device 100 via his or her finger.

The enclosure 104 defines a cavity that may at least partially enclose the various components of the mobile computing device 100. The enclosure 104 may include apertures defined within the enclosure 104. The apertures may allow select components to extend past or communicate outside of the enclosure 104. For example, a button 110 or switch may be inserted through an aperture in the enclosure 104 so that a user may activate the button, or a charging plug or audio plug may be inserted or positioned through an aperture of the enclosure to communicate with internal components.

The receiving port 108 is configured to receive a plug such as an analog audio plug, charging cord, output device, a tip ring sleeve connector, and the like. The receiving port 108 is formed in the enclosure 104 to electrically connect an external device (e.g., headphones, speakers) to one or more internal components of the mobile computing device 100. The receiving port 108 may be configured to provide a pathway between the outside surface of the mobile computing device 100 and the internal components surrounded or encased by the enclosure 104.

The input member 106 permits a user to provide input to the mobile computing device 100. The input member 106 may be one or more buttons, switches, or the like that may be pressed, flipped, or otherwise activated in order to provide an input to the mobile computing device 106. For example, the input member 106 may be a button to alter the volume, return to a home screen, or the like. Additionally, the input member 106 may be virtually any size, shape, and may be located in any area of the mobile computing device 100. Furthermore, the input member 106 may be combined with the display screen 102 as a capacitive touch screen.

Figure 3:
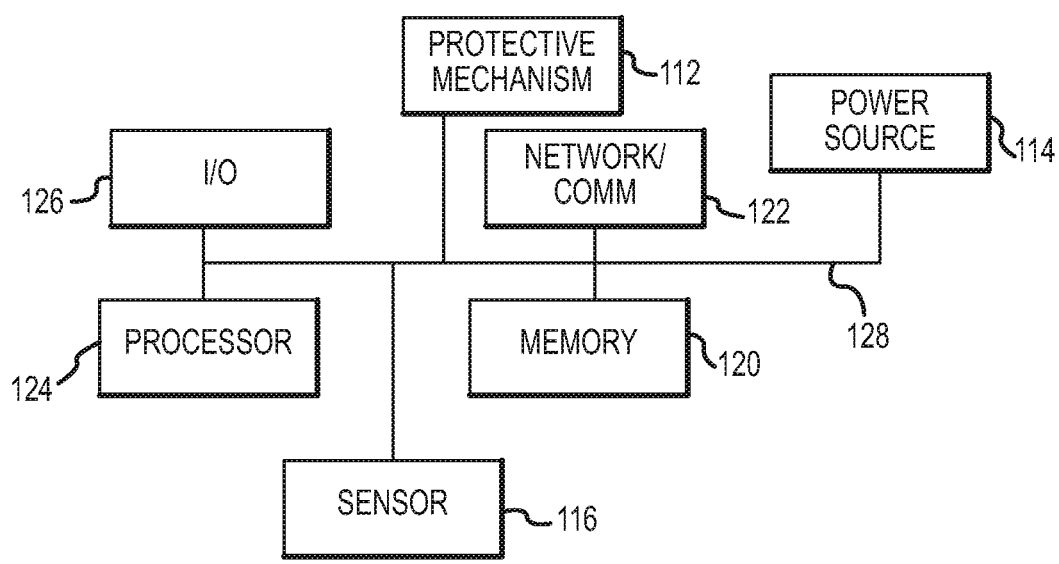
FIG. 3 is an exemplary block diagram of the mobile electronic device of FIG. 1.

FIG. 3 is a block diagram of an embodiment of the mobile computing device 100 illustrating select electrical components. The mobile computing device 100 may include a protective mechanism 112, a power source 114, sensors 116, a processor 124, memory 120, a network/communication interface 122, and an input/output interface 126 all connected together by a system bus 128. The mobile computing device 100 may include additional components that are not shown; and FIG. 2 is meant to be exemplary only.

The protective mechanism 112 includes protective means, described in more detail below, but generally the protective means may help to minimize or prevent damage to the mobile computing device 100 that may occur as a result of a freefall. For example, the protective mechanism 112 may vary the angular momentum of the mobile device 100 as it is falling so that the device 100 may impact on a certain surface or particular portion of the device 100. Or in other examples, the protective mechanism 112 may grip a plug (such as headphone jack) in order to prevent or mitigate the freefall. In still other examples, the protective mechanism 112 may retract certain components from an exterior of the device 100 prior to impact, in order to help prevent damage to those components.

The sensors 116 may be in communication with the processor 124 and may help to determine whether the mobile device 100 is in a freefall position, how fast the mobile device 100 may be falling, orientation of the device, and a distance (or how much time) to an impact surface. The sensors 116 may be varied depending on the protective mechanism 112 and may similarly be positioned substantially anywhere on or within the device 100. Similarly, there may be a single sensor 116, or multiple sensors 116. The sensors 116 may take any suitable form and in some embodiments may the form of one or more of the following: an accelerometer, gyroscopic sensor, distance, position or orientation sensors (e.g., radar, ultrasonic, magnetometer, and the like), location sensors (e.g., global position system (GPS), signal triangulation), image sensors (e.g., camera), sound or audio sensors (e.g., speakers, microphones) which may be used as a sonar combination, and so on.

The sensors 116 may collect and provide data related to a fall event to the processor. For example, an accelerometer may be utilized to determine a freefall state of the device and/or the orientation of the device relative to gravity immediately before the fall event. The magnetometer may be utilized to determine orientation of the device relative to the magnetic north pole. The speaker and microphone may be used together as an echolocation device to determine a distance to the impact surface. Similarly, two cameras or a projector and a camera may be used for depth perception to determine the distance to the impact surface. Specifically, the two cameras may be used to determine a stereovision depth perception. The projector may project a pattern, such as a checkered pattern or two lines, that may be captured by the camera and analyzed to determine depth. The camera is located a certain distance from the projector and the distance between the projector and camera allows depth perception similar to the distance between human eyes providing depth perception. The GPS may be used to track the location of the device to determine if it is indoors or outdoors. If indoors, the camera can be used to recognize and track known objects to determine orientation (e.g. a fluorescent light or ceiling fan will usually be on the ceiling, a clock will usually be on a wall, etc.). If outdoors, a camera may be used to sense the sun's location, an internal clock may determine the time of day and an algorithm may calculate the sun's azimuth to determine a direction to the ground and, hence, the orientation of the device relative to the ground. The rotational velocity of the device may be determined using the gyroscope and/or the camera. The distance to the ground may be determined using camera, a speaker/microphone sonar combination or, in some embodiments, a lookup table may be used.

Further, the orientation of the device relative to its environment may be determined. For example, the camera may be used for discerning and tracking the face of the user or other people in the area. Specifically, the face detection may be used to determine an orientation of the device and/or a rotation of the device. Additionally, the face detection and tracking may be used to determine the position of the device relative to the ground based on the faces generally being away from the ground. In another example, the camera may be used to track item in a known location, such as ceiling lights, ceiling fans, or a clock on a wall. In each of the examples, the determination and tracking of the objects may allow determination of the relative orientation of the device. Data provided from the sensors 116 may be useful to determine other characteristics of the freefall and impact as well, such as the time of flight (e.g., how long the device fell, if the fall was straight down or had a curved flight, and force at impact).

The power source 114 provides power to the mobile electronic device 100. The power source 114 may be a battery, power cord, solar panel, and so on. The power source 114 may provide power to various components of the mobile computing device 100. Additionally, the power source 114 may be removable or permanently attached to the mobile electronic device 100. For example, the power source 114 may be a battery that may be removed from the device or the power source 114 may be a power cord that may be substantially secured to the mobile device 100.

The network/communication interface 122 may receive and transmit various electrical signals. For example, the network/communication interface 122 may be used to place phone calls from the mobile computing device 100, may be used to receive data from a network, or may be used to send and transmit electronic signals via a wireless or wired connection (e.g., Internet, WiFi, Bluetooth, or Ethernet).

The memory 120 may store electronic data that may be utilized by mobile computing device 100. For example, the memory 120 may store electrical data e.g., audio files, video files, document files, and so on, corresponding to various applications. The memory 120 may be, for example, non-volatile storage, a magnetic storage medium, optical storage medium, magneto-optical storage medium, read only memory, random access memory, erasable programmable memory, or flash memory.

In some implementations, the memory 120 may store information corresponding to a freefall and/or impact of the electronic device 102. The sensors 116 (in combination with the processor 124) may provide information such as fall height, velocity, fall or drop orientation, impact orientation, applications running at the beginning of the fall, and so on. The memory 120 may be configured to store the information and/or transmit the information (via the network/communication interface 122) to a second electronic device.

The processor 124 may control operation of the mobile computing device 100 and its various components. The processor 124 may be in communication with the sensors 116 and the protective mechanism 112. For example, the processor 124 (based on inputs from the sensors 116) may activate or modify the protective mechanism 112 as necessary or desired. The processor 124 may be any electronic device cable of processing, receiving, and/or transmitting instructions. For example, the processor 124 may be a microprocessor or a microcomputer.

The processor 124 may also determine certain characteristics or features of a particular freefall and impact. For example, the processor 124 may determine a height of the freefall after impact by using the time of freefall and the velocity of the fall. The information regarding the characteristics of the freefall and impact may be stored even if a particular protective mechanism or device may not be able to be activated. In this manner, the processor 124 may be able to more easily predict characteristics of another freefall and impact.

The input/output interface 118 facilitates communication by the mobile computing device 100 to and from a variety of devices/sources. For example, the input/output interface 118 may receive data from user, control buttons on the mobile computing device 100, and so on. Additionally, the input/output interface 118 may also receive/transmit data to and from an external drive, e.g., a universal serial bus (USB), or other video/audio/data inputs.

Figure 4A:
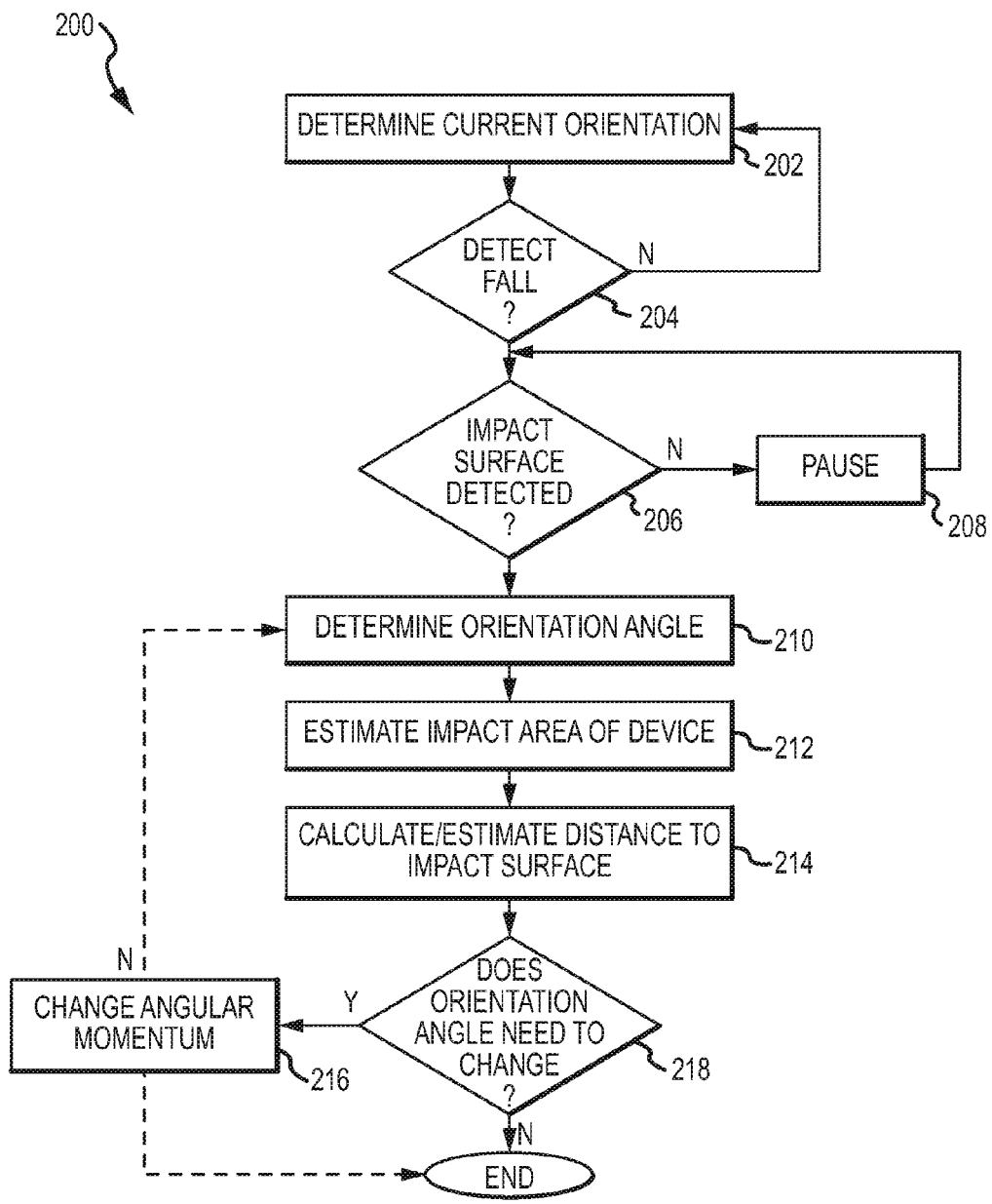
FIG. 4A is one embodiment of a flow chart of a method for altering an orientation of a device during freefall.

FIG. 4A is a block diagram of a first embodiment for a method of helping to prevent or reduce damage to a device during free-fall. The method 200 begins with operation 202 and the current orientation of the mobile computing device 100 is determined. Operation 202 may be completed via the sensors 116, for example, a gyroscopic sensor may be used to determine the current orientation of the mobile computing device 100. The sensors 116 may determine whether the mobile computing device 100 positioned upright, sideways, angled, upside down, and so on. Once the orientation is determined, the method 200 proceeds to operation 204. The orientation may be determined at predetermined intervals, e.g., every ½ second or the like, random intervals, or so on. The time intervals may be based on power conservation or user preferences.

In operation 204, the mobile computing device 100 determines if a fall is detected. For example, a fall may be detected if the mobile computing device 100 has been dropped by a user, pushed off of a surface, and so on. Operation 204 may be completed via the sensors 116. In one example, an accelerometer may detect when the device 100 is entering a freefall. This is because when the device 100 is resting on a surface (or otherwise supported), the gravity force exerted on the reference frame of the accelerometer may be approximately 1 G upwards. Then, as the device 100 enters freefall, the gravity force may be reduced to approximately zero, as gravity acts on the device to pull the device 100 downward. Other types of sensors 116 may also be used other than an accelerometer, therefore the actual values may vary for determining whether the device 100 is in freefall. If a freefall is not detected, the method 400 may proceed back to operation 202. However, if a freefall is detected the method may proceed to operation 206.

In operation 206 it is determined whether the impact surface is detected. For example the sensors 116 may include a position sensor to determine the distance to the impact surface and/or the time that it may take the device 100 to reach the impact surface. The sensors 116 may utilize images, sonar, radar, and so on in order to determine the distance to the ground. If the impact surface is not detected, which may be because the impact surface is too far away to be determined by the sensor 116, then the method 200 may proceed to operation 208. In operation 208 the device 100 may pause for a select time. The pause time may be varied and may be dynamically adjusted or may be a set predetermined time. The method 200 may pause at operation 206 to allow time for the device 100 to descend further so that the impact surface may be detectable. Therefore, after operation 208, the method 200 may proceed again to operation 206, and the device 100 may determine if the impact surface is detected once again. If the impact surface is detected the method 200 proceeds to operation 210.

Operation 210 determines the orientation angle of the device 100 and may utilize the sensors 116 to determine the orientation of the angle. As the device 100 may be in the middle of a freefall state and therefore the orientation may be rapidly changing (e.g., if the device 100 is rotating while falling), therefore the orientation may include a rotational axis of the device, rather than simply a current orientation of the device. Additionally, it should be noted that in operation 210, the orientation angle 210 may include not only the position of the device 100 relative to a "normal" position, but also its height in space. For example, the orientation angle may be a three-dimensional vector, e.g., along an x, y, and z axis, see e.g., FIG. 5C.

Once the orientation angle of the device 210 is determined, the method 200 may proceed to operation 212 and the distance to the impact surface may be detected or calculated. If the impact surface is detected, the device 100 may estimate the time to impact with the impact surface based on the freefall velocity and the distance to the surface. The device 100 may utilize an accelerometer sensor as well as a position sensor in order to estimate or calculate the distance to impact surface.

Once the distance to the impact surface has been calculated or estimated in operation 212, the method may proceed to operation 214 and the impact area of the device may be estimated. Operation 212 may take into account the orientation angle (including the rotation axis) of the device 100, and/or angular momentum of the device, as well as the distance or time to the impact surface. For example, operation 212 may utilize the distance/time to the impact surface, the current orientation of the device 100 in three dimensions, as well as the current angular momentum of the device 100. In other words, if the device 100 is a certain distance from the impact surface, rotating along a particular rotational axis with a particular angular momentum, then the estimated impact area may be determined to be the front top portion of the device 100.

Once the impact area of the device 100 has been estimated, the method 200 may proceed to operation 218. Operation 218 determines whether the orientation angle may need to change. The orientation angle may need to be changed or varied so that the device 100 may be orientated (while during freefall) to potentially reduce the risk that the device 100 may hit the impact surface in a particular orientation. For example, if the device 100 were to impact the surface on the front side the display screen 102 may be significantly damaged as the display screen 102 may be glass or other relatively fragile material. On the contrary, if the device 100 were to land on its side or back, the enclosure 104 may provide substantial protection for the device 100 and may not be substantially damaged. Thus, based on the estimated impact area of the device, the device 100 may determine that the orientation angle may need to be changed so that the device may land on its side or back, for example.

In one example, the device 100 may be divided mathematically into different areas or zones that may be ranked in a particular order based on the zone's vulnerability to damage due to an impact. These zones can also change depending on drop height. That is, one area might never fail below a threshold drop height and often fail above the threshold, while another could have linear failure rates with height. Additionally, the zones can change based on a rotational direction and rate. For example, if the camera is facing the ground but the device is rotating such that the camera is moving toward the ground faster than the device's center of mass it may be ranked as a highly vulnerable zone, whereas if the camera is moving slower toward the ground than the device's center of mass due to the rotation of the device it may be ranked as a less vulnerable zone. For example, the display screen 102 may have a high vulnerability, whereas the side or back of the enclosure 104 may have a lower vulnerability. Operation 218 may determine the zone or area which may be configured to impact the surface and then change the angular momentum of the device 100 so that another zone may be configured to hit the surface. Additionally, the vulnerability of the zones may be ranked by the user. For example, if the user has included a particular case to enclose a portion of the device 100, he or she may alter the zones so that the areas covered by the case may be ranked to have the lowest vulnerability, that is, they may be able to withstand the most amount of force.

If, in operation 218, the orientation angle needs to change, the method 200 may proceed to operation 216. Operation 216 changes the angular momentum of the device 100. For example, one or more protective mechanisms 112 may be activated. The protective mechanism 112 may then alter the angular momentum of the device 110. For example, the protective mechanism (as discussed in more detail below), may vary the center of mass of the device 100 so that the rotational axis may be varied. As the center of mass is varied, the rotational axis of the device may be varied. The rotational axis of the device 100 may determine the surface and impact orientation of the device 100 when it intersects with the impact surface. For example, if the device 100 is rotating about a y axis there may a certain probability that the device 100 will impact the surface at a particular orientation, versus if the device 100 is rotating about the x axis.

Once the protective mechanism 118 has been activated, the method 200 may optionally return to operation 210. In this embodiment, the device 200 may proceed repeatedly between operations 210, 212, 214, 216, 218 to dynamically vary the rotational axis of the device 100. This may better ensure that the device 100 may be orientated in a desired manner so as to help to minimize damage to the device 100 when it impacts the surface. However, in other embodiments, the method 200 may terminate after operation 218. For example, some of the protective mechanisms 112 described below may only be activated once prior to impact.

Figure 4B:
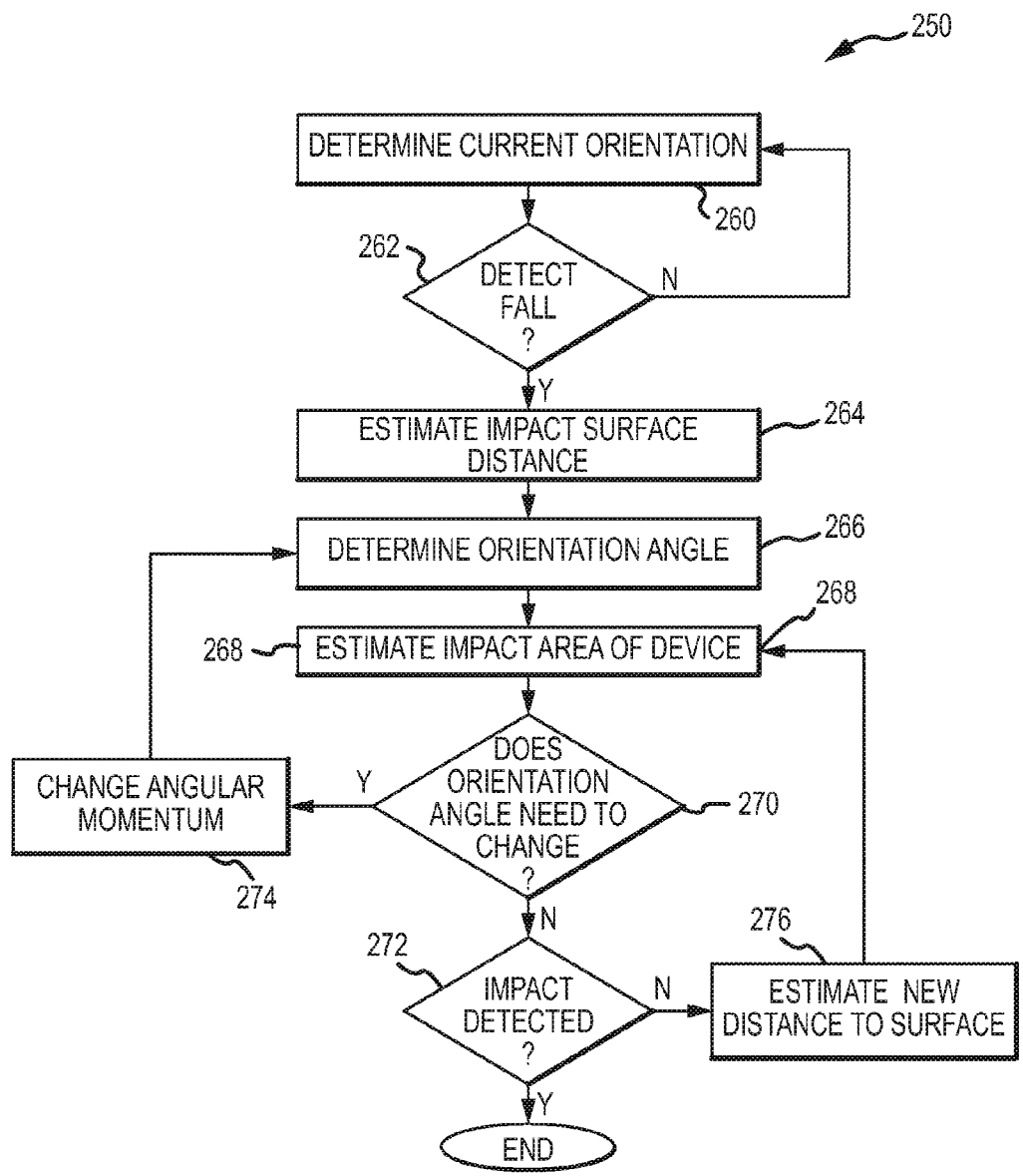
FIG. 4B is a second embodiment of a flow chart for a method for altering an orientation of a device during freefall.

FIG. 4B is a flow chart illustrating a second embodiment of the method 200 illustrated in FIG. 4A. The method 250 may be substantially similar to the method 200 illustrated in FIG. 4A, however, in the method 250 of FIG. 4B, the impact surface may not be known. The method 250 may begin at operation 260 and the current orientation of the device 100 may be determined. Operation 260 may be substantially similar to operation 210, and the sensors 116 may determine the orientation of the device 100. The method 250 may be configured so that this operation 260 may be completed at select time intervals. For example, the device 100 may determine its current orientation every 1 second, ½ second, or the like. After operation 260, the method 250 may proceed to operation 262. In operation 262 the device 100 determines whether a fall is detected. Similar to operation 212, the sensors 116 may determine if there has been a change in the gravity vector or other fall indicator (e.g., if the velocity of the device 100 has suddenly and/or unexpectedly increased).

If a fall is detected, the method 250 may proceed to operation 264 and the distance to the impact surface may be estimated. The estimation may be a predetermined value or a dynamically generated estimation. In one example, the impact surface may be estimated at approximately 3 to 4 feet, which is a typical distance that a mobile device 100 may be dropped. For example, many users may carry their mobile devices 100 in their pockets or purses, and may drop the mobile device 100 while accessing the device 100 from his or her pocket or purse, which may be at a height of approximately 3 to 5 feet. The estimated distance to the impact surface may also be varied depending on the embodiment of the mobile electronic device 100. For example, a laptop may generally be dropped from different heights than a mobile phone and therefore the estimated distance to the impact surface may be different for the laptop than for the mobile phone. In embodiments of the mobile device 100 utilizing the method 250, a position sensor may not be needed, as the impact surface may not need to be detected, as the distance to the impact surface may be estimated, rather than determined.

Once the distance to the impact surface has been estimated, the method 250 may proceed to operation 266. In operation 266 the device 100 determines its current orientation. This operation 266 may be substantially similar to operation 210, and the orientation angle may include a rotational axis, angular momentum, and a position of the device 100 within a three dimensional space. This may be determined by sensor 116 or multiple sensors 116. For examples, the sensors 116 may include a three axes gyroscopic and accelerometer that may be able to determine the angular moment of the device and the rotational axis of the device.

After operation 266, the method 250 may proceed to operation 268 and the impact area of the device 100 may be estimated. Similar to operation 214 in method 200, the operation 268 may determine the estimated impact surface of the device 100. This may include the position of the device 100 as the device 100 may impact the surface at the end of the freefall. The position of the device 100 at impact may be estimated by the rotational axis, angular momentum and estimated impact surface distance.

Once the impact area of the device 100 is estimated, the method 250 proceeds to operation 270 and the device 100 determines whether its orientation needs to be changed. For example, the device 100 may determine whether the estimated impact area is a more vulnerable area (or zone) than others areas (or zones) of the device, such as whether the device 100 may hit the display screen 102. If the orientation of the device 100 needs to change the method 200 proceeds to operation 274 and the angular momentum of the device 100 may be changed. For example, the protective mechanism 112 may be activated so that the rotational axis of the device 100 may be varied so that the estimated impact area of the device 100 may be altered.

After the protective mechanism 112 has been activated, the method 250 may return to operation 266, and the orientation angle of the device 100 may be recalculated and operations 268 and 270 may be repeated. This allows for the device 100 to dynamically adjust the potential impact area and to readjust after the protective mechanism 112 has been activated. However, it should be noted that in some embodiments, the protective mechanism 112 may only be activated once and therefore there may only be a single chance to alter the angular momentum of the device 100. In these embodiments, after operation 274, the method 250 may not return to operations 266, 268, and 270.

If in operation 270, the device 100 determines that the orientation angle does not need to change (for example, the protective mechanism 112 has been activated once already in operation 274), then the method 250 may proceed to operation 272 and the device 100 determines whether an impact is detected. This operation 274 may be utilized as the distance to the impact surface may not be known, and may need to be dynamically adjusted mid-fall. If the impact is detected 272 the method 250 may end. However, if the impact is not detected, the method 250 may proceed to operation 276 and the device 100 may estimate a new distance to the surface.

This new estimate may utilize an iterative process to more accurately determine the fall distance and the new estimate may be a portion of the original estimated distance. For example, the new estimate may only be 1 foot or less whereas the original estimated distance may be approximately 4.5 to 5 feet. This is because the device 100 may assume that it has fallen a certain distance already, so that the new distance to the surface may be much smaller than the original estimate. The new estimated distance may be individually determined based on common heights that the particular device 100 may be normally dropped.

After operation 276, the method 250 may return to operation 268 and the impact area of the device 100 may be determined. The method 250 may then proceed through the operations 270, 274, and 272. Thus, the device 100 may iteratively estimate the fall distance, which may allow the device 100 to update and vary the potential impact surface as the device 100 is in a freefall.

In one embodiment the protective mechanism is configured to alter the rotational axis of the device 100 as it is in freefall by altering the center of mass. As the center of mass is varied the rotational axis may also varied, changing the angular momentum of the device 100. In another embodiment, the protective mechanism 112 may be activated in order to help prevent the device 100 from entering freefall. Additionally, the protective mechanism 112 may help reduce the rotation of the device 100 as it is falling. For example, the protective mechanism 112 may produce a force that may be opposite to the rotational force exerted on the device 100 during freefall. Reducing the rotational velocity of the device 100 may help to reduce the impact velocity of the device 100 as it hits the surface.

Figure 5A:
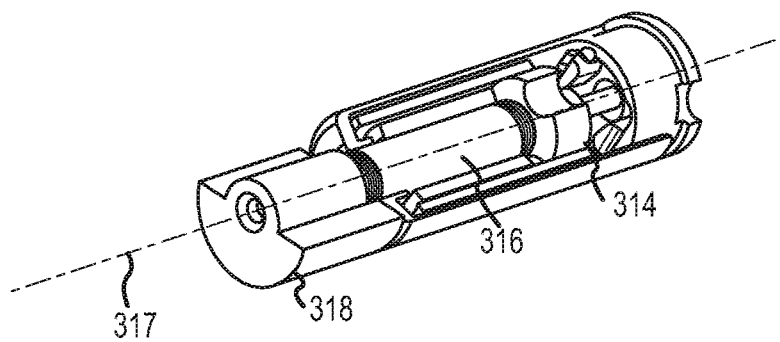
FIG. 5A is an isometric view of a first embodiment of a protective mechanism for the mobile electronic device of FIG. 1.

FIG. 5A is a perspective view of a first embodiment of the protective mechanism 312. In this embodiment, the protective mechanism 312 may include motor 314 that may drive a mass 318 via a drive shaft 316. The protective mechanism 312 may be operably connected to the device 100, for example, the protective mechanism 312 may be enclosed within the enclosure 104. The protective mechanism 312 may alter the center of mass of the device 100 by varying the position of the mass 318. The mass 318 may be eccentrically connected to the drive shaft 316, and therefore as the mass 318 is rotating it may create a vibration through the device 100 (e.g., as a vibrating alert). In other examples, the mass 318 may be centered on the drive shaft 316.

The protective mechanism 312 may be configured so that the mass 318 may rotate at substantially the same speed as it may rotate when functioning as an alert for the device 100. In other examples, the motor 314 may rotate the mass 318 at a higher rotation per minute during a freefall than an alert. In some implementations, the rotational speed may be so fast that it may not be able to be sustained long term, in that it may burn out the motor 314. However, in these implementations the motor 314 may be able to more quickly affect the rotational velocity of the device 100.

When activated, such as in operations 216, 274, the motor 314 activates the drive shaft 316, which may then rotate the mass 318. In some implementations, the mass 318 may have a rotational axis 317 centered approximately through a centerline of the drive shaft 316. The rotational axis 317 of the mass 318 refers generally to the axis that the mass 318 rotates around when rotated by the motor 314. The mass 318 may be rotated so that it may be positioned differently within the enclosure 104, or the mass 318 may continue to rotate in order to vary the center of mass of the device 100. As the mass 318 is repositioned or rotated, the center of mass for the device 100 is altered, which may vary the angular momentum of the device 100 when/if the device 100 is in a freefall.

Figure 5B:
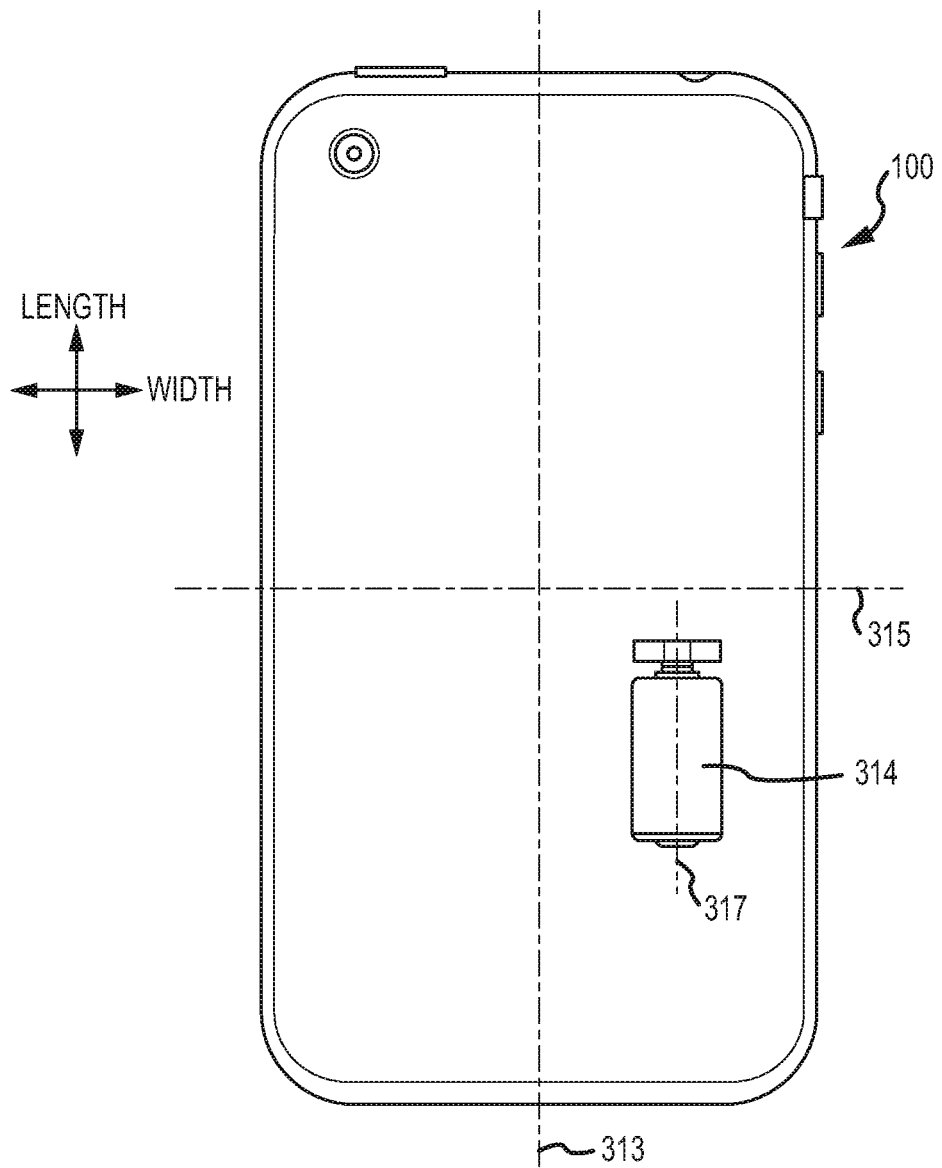
FIG. 5B is a rear plan view of the mobile electronic device of FIG. 1 illustrating a long axis and a position of the protective mechanism of FIG. 5A relative to the long axis.

FIG. 5B is a rear elevation view of the electronic device 100 illustrating a long axis 313 and a short axis 314. The long axis 313 may be positioned along a center of the device 100 and its length. The short axis 314 is positioned along a center of the device 100 across its width. The length and width of the device 100 correspond to the length and width of the device 100 as shown in FIG. 5B and indicated in the legend shown in FIG. 5B. The terms length and width are representative only. Accordingly, in the event that the device 100 orientation changes, the terms length and width may generally refer to the dimensions illustrated as length and width in FIG. 5B.

Figure 5C:
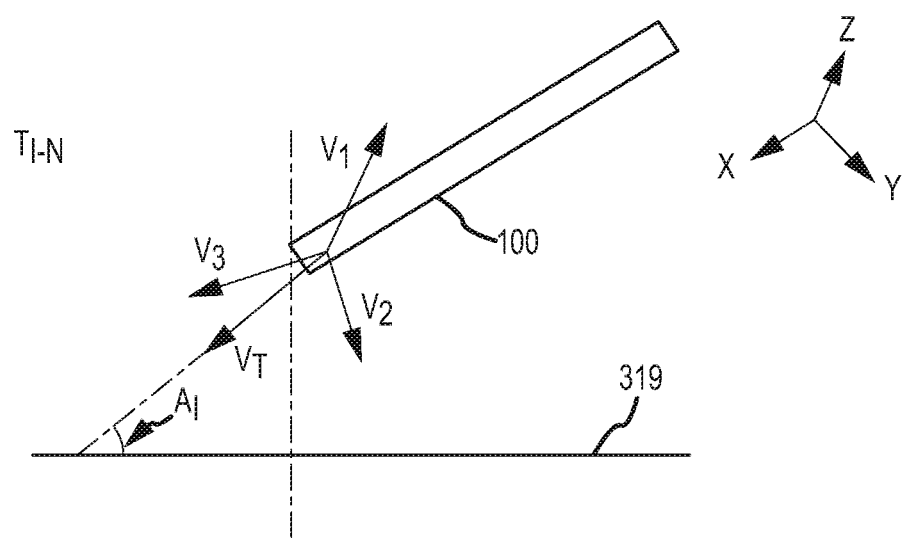
FIG. 5C is a side elevation view of the mobile electronic device of FIG. 1 during a freefall prior to impacting a surface.

Angular momentum is a vector used to describe the state of a system resulting from rotation around an axis. As may be appreciated, angular momentum may be estimated in a number of different ways. For a fixed mass object rotating about a fixed symmetry axis, angular momentum may be expressed as the product of the moment of inertia and angular velocity. The angular momentum vector is in the same direction as the angular velocity vector. Angular velocity evaluation may allow for angular momentum to be evaluated in three components (e.g., three axes). Specifically, three orthogonal axes may be utilized with the component vectors, each having a direction of an axis and a magnitude of rotation about the axis, to determine angular velocity which, in turn, may be used for calculation of angular momentum. FIG. 5C is a side elevation view of the electronic device 100 in a freefall at a time prior to impact $T_{i-n}$. As shown in FIG. 5C, the angular momentum of the electronic device 100 during freefall may be the value of the resultant vector $V_r$. The vector $V_r$, including magnitude and direction, may be calculated from the orthogonal angular velocity vectors $V_1$, $V_2$, and $V_3$. It should be understood that this example shown in FIG. 5C is illustrative and there are other techniques for determining angular momentum of the device during freefall.

Figure 5D:
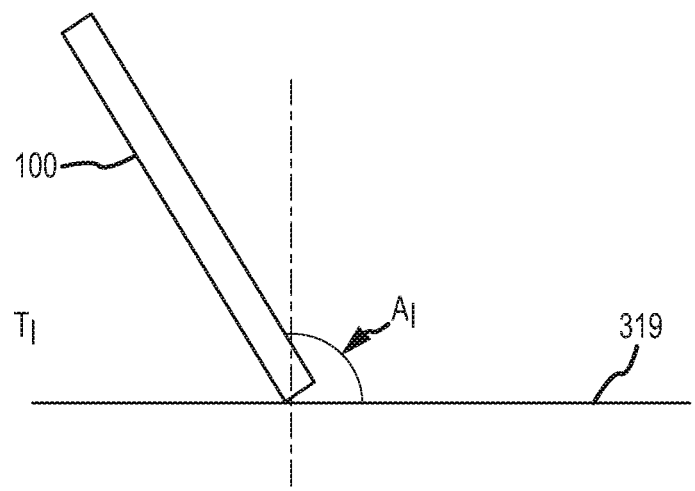
FIG. 5D is a side elevation view of the mobile electronic device of FIG. 1 after a freefall and at the moment of impacting the surface.

The projected impact angle $A_i$ of the electronic device 100 at any given time may be the angle taken from the closest point of the device 100 to the impact surface, relative to a plane parallel to the impact surface 319. Or, when the device actually impacts the surface 319, the impact angle $A_i$ may be taken with respect to the first impacted area of the device with respect to the impact surface 319. As the device 100 may be rotating, it may have a different impact angle $A_i$ at different distances from the surface, as shown in FIGS. 5C and 5D. Accordingly, the impact angle $A_i$ has a first value at $T_{i-n}$, and as shown in FIG. 5D, a second value at $T_i$. The impact angle $A_i$ may be altered by the protective mechanism 312.

Referring again to FIG. 5B, in some embodiments, the protective mechanism 312 may be positioned so that the rotational axis 317 of the mass 318 may be positioned substantially perpendicular to the short axis 315 of the device 100 and substantially parallel to the long axis 313. In these embodiments, the protective mechanism 312 may be better able to affect the orientation angle or eventual impact angle $A_i$ of the device 100. This is because the degree change that the protective mechanism 312 may be able to adjust the impact angle $A_i$ may depend on a ratio of the protective mechanism's 312 moment of inertia to the moment of inertia of the device 100 about the long axis 313

For instance, the angular velocity of the device 100 may be related to the moment of inertia of the mass 318 over the moment of inertia of the device 100 multiplied by the angular velocity of the mass 318. This is expressed in Eq. (1) below.

$$\omega_{Device} = \frac{I_{Mass}}{I_{Device}} \times \omega_{Mass} \qquad \text{Eq. (1)}$$

As shown in Eq. (1), the angular velocity of the device 100 may be affected by the angular velocity of the mass 318. However, it should be noted that the protective mechanism 312 may be only be able to affect the value of a single vector of $V_1$, $V_2$, and $V_3$. However as the total angular momentum of the device 100 may be a sum of each of the vectors $V_1$, $V_2$, and $V_3$, by rotating the mass 318, the protective mechanism 312 may alter the angular velocity (and thus may alter the orientation of the device 100) during freefall.

Figure 1B:
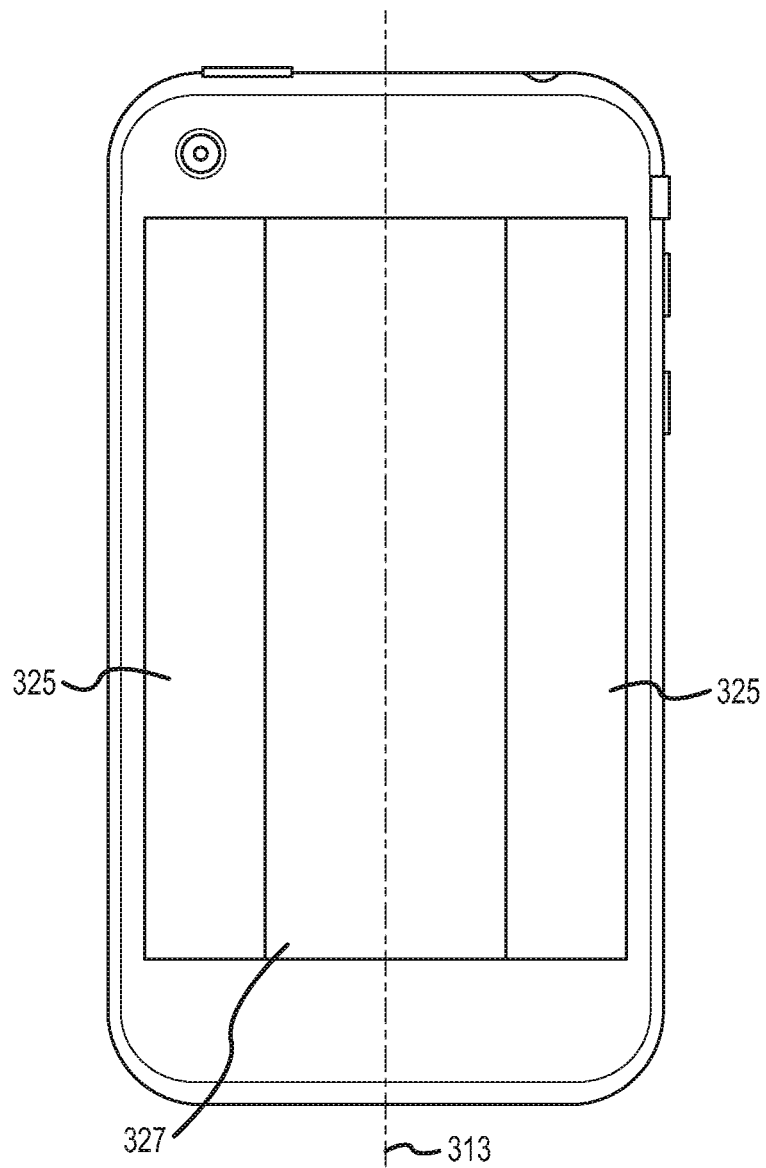
FIG. 1B is a rear elevation view of the mobile electronic device.

Similarly, as shown in FIG. 1B, in some instances, the protective mechanism 312 may be positioned in a first zone 327 of the device 100. The first zone 327 may be positioned at or adjacent to a center point or center line 313 of the device 100. By moving the protective mechanism 312 or at least the mass 318, the rotation moment of inertia of the device 100 about an axis may be significantly reduced. By reducing the rotation moment of inertia of the device 100, the propensity of the device 100 to maintain its dropped angular orientation may be reduced. In other words, the device 100 may be more susceptible to the angular changes introduced by the protective mechanism 312. Thus, the protective device 312 may more easily alter the fall orientation of the device 100.

Substantially any point of mass in the device 100 will contribute to the moment of inertia proportionally to the density of the mass and the square of its distance from a rotational axis of the device 100. This concept is expressed mathematically in Eq. (2), as shown below.

$$I = \int_V \rho(r) d(r)^2 \, dV(r) \qquad \text{Eq. (2)}$$

By placing the mass 318, the protective mechanism 312, or other dense components of the device 100 in the first zone 327, the rotational moment may be reduced. Thus, the fall orientation of the device 100 may be more easily affected by the protective mechanism 312. For example, the motor 314 may be able to rotate the mass 318 at a slower rate, the mass 318 may be smaller, and so on, for the device 100 orientation to still be altered during freefall. Therefore, in some examples, more dense components of the device 100 may be placed in the first zone 327, while the less dense components of the device 100 may be placed in the second zones 325 that are farther away from the center point of the device 100.

In other examples, in addition to utilizing the mass 318 of the protective mechanism 312, the moment of inertia of the device 100 may also be altered (thus making the device 100 more likely to be able to switch orientations) by adding additional mass to a rotation section of the motor 314, e.g., the drive shaft 316. In this manner, the drive shaft 316 and the mass 318 may be positioned close to the center of the device 100 in order to more greatly affect the moment of inertia of the device 100. In another example, a secondary mass may be added to the protective mechanism 312. The secondary mass (not shown) may be centered or eccentric with respect to the drive shaft 316. Additionally, the secondary mass may be connected via a clutching mechanism so that it may be selectively rotated, e.g., may be only rotate during a freefall and not during an alert. Similarly, in other embodiments, the protective mechanism 312 may include additional motors (not shown) to drive an additional mass or more quickly drive the mass 318.

Figure 6:
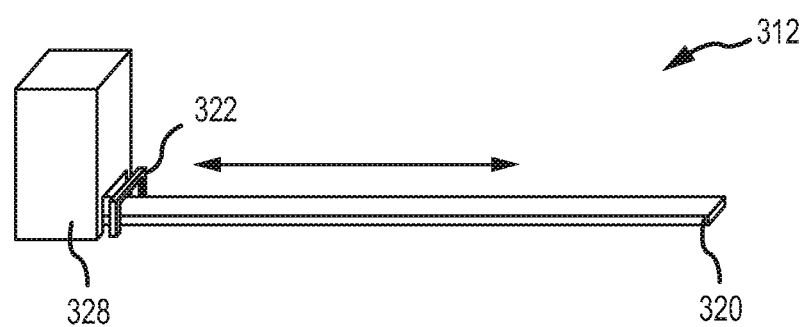
FIG. 6 is an isometric view of a second embodiment of the protective mechanism for the mobile electronic device of FIG. 1.

FIG. 6 is a perspective view of a second embodiment of the protective mechanism 312. In this embodiment, the position of the mass 328 may be varied within the enclosure 104 as the mass 328 may slide or otherwise travel along a track 320. The mass 328 may be substantially secured in a first position by a latch 322, and as the latch 322 is released the mass 328 may travel along the guide track 320. The mass 328 may then be repositioned at a position along a length of the guide track 320 (or at a terminal end of the guide track 320) and may be secured in place via the latch 322, or another mechanism. In one example, the track 320 may include electromagnets dispersed along its length and the mass 320 may include a magnetic material. Then, at the desired position of the track 320, the respective electromagnet may be activated. In other examples, the mass 328 may be configured to slide the entire length of the track 320 and then be secured in place.

In another example of the protective mechanism 312 of FIG. 6, a linear motor may be used to move and stop the mass 328 along the guide track 320. In this example, the mass 328 may be able to stop at substantially any position along the guide track 320 and the movement and speed of the mass 328 may be able to be better controlled.

In the above examples as the mass 328 is repositioned within the enclosure (along the track 320 or by rotation), the mass 328 may vary the center of mass of the device 100. This is because the center of mass is the mean location of all the mass of the device 100, and so as the location of the mass 328 varies, the mean location of all of the mass of the device 100 may vary. For example, the weight of the mass 328 may be selected so that it may form a high enough percentage of the mean mass of the device 100, so that as its position is varied it may change the center of mass for the device 100.

Figure 7A:
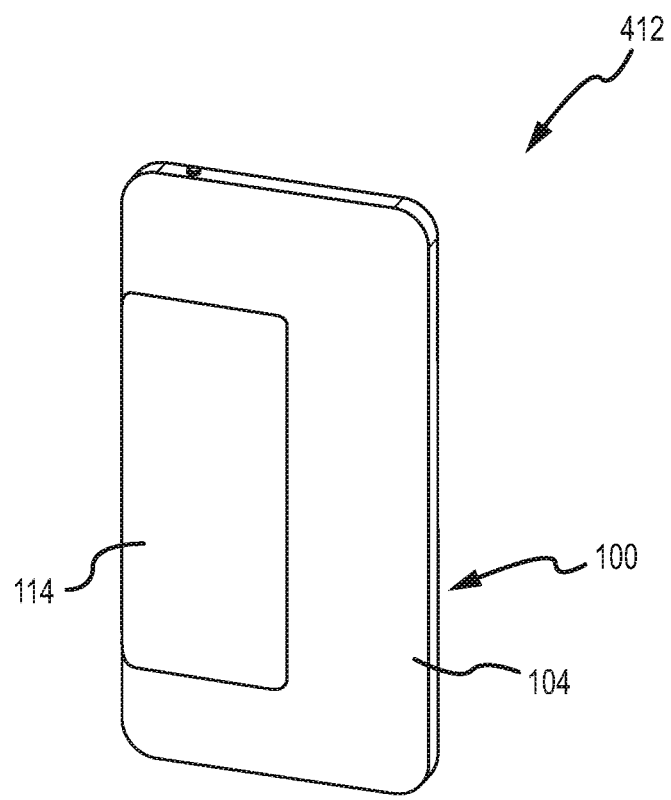
FIG. 7A is a side elevation view of the mobile electronic device of FIG. 1.
Figure 7B:
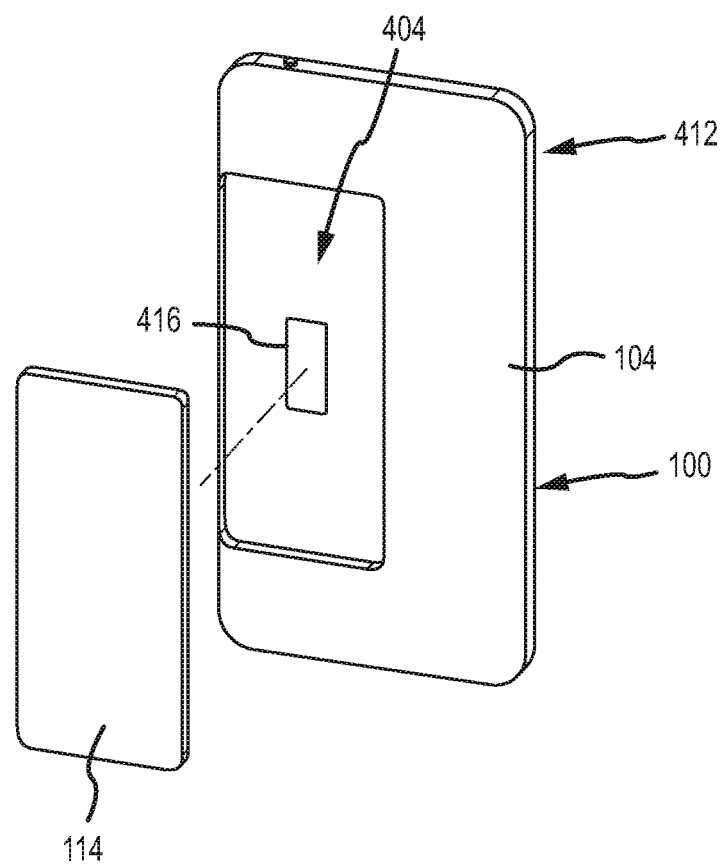
FIG. 7B is a side elevation view of the mobile electronic device illustrating a third embodiment of the protective mechanism.

FIG. 7A is a rear perspective view of the device 100 illustrating the power source 114, which in this example, may be a separately protected and encased battery. FIG. 7B illustrates the power source 114 ejected from the device 100. A third embodiment of the protective mechanism 412 may include ejecting the power source 114 from the device 100. For example, the protective mechanism 412 may include an ejecting member 416 that may eject or otherwise disconnect the power source 114 from the device 100. The ejecting member 416 may be, for example, a spring, air (e.g., from a canister or produced by an electrical or chemical reaction), a linear rail across which the battery's potential is applied, providing propulsion, a latch or other member that may exert either a positive force on the power source 114 or remove a restraint on the power source 114, allowing the power source 114 to eject from the device 100

In some examples the power source 114 may form a large percentage of the mass of the device 100 compared with other components. For example, batteries may often weigh more than other electrical components. Therefore, in these examples, as the protective mechanism 412 is activated and the ejecting member 416 ejects the power source 114, the center of mass for the device 100 may be altered. Also, reducing the device's mass will decrease the impact force of the remainder of the device. As the power source 114 is ejected, the enclosure 104 may include a depression 404 where the power source 114 had originally been received. Additionally, although not shown, in some embodiments, the device 100 may include a cover or other protective member that may encase a portion of the power source 114 within the enclosure 104. In these embodiments, the cover may also be ejected along with or prior to the power source 114 being ejected.

Figure 8A:
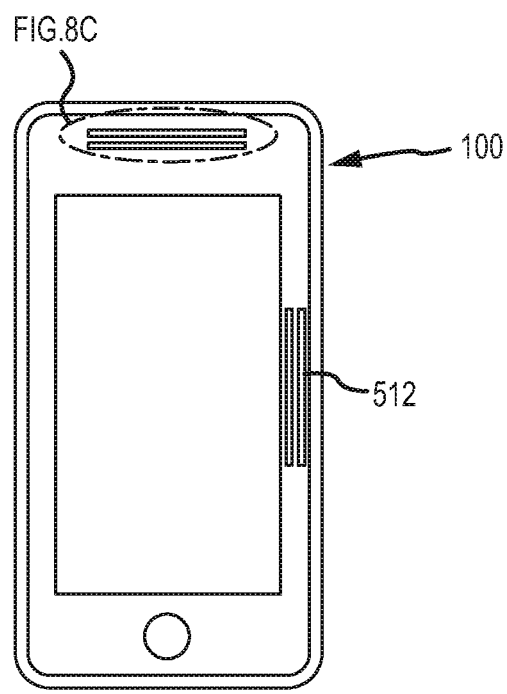
FIG. 8A is a front elevation view of the mobile electronic device of FIG. 1 illustrating a fourth embodiment of the protective mechanism.
Figure 8B:
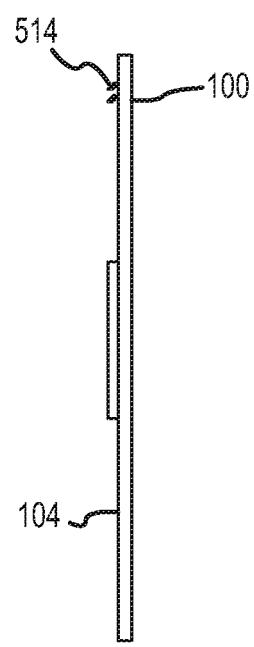
FIG. 8B is a side elevation view of the mobile electronic device of FIG. 1 illustrating the protective mechanism of FIG. 8A in an activated position.
Figure 8C:
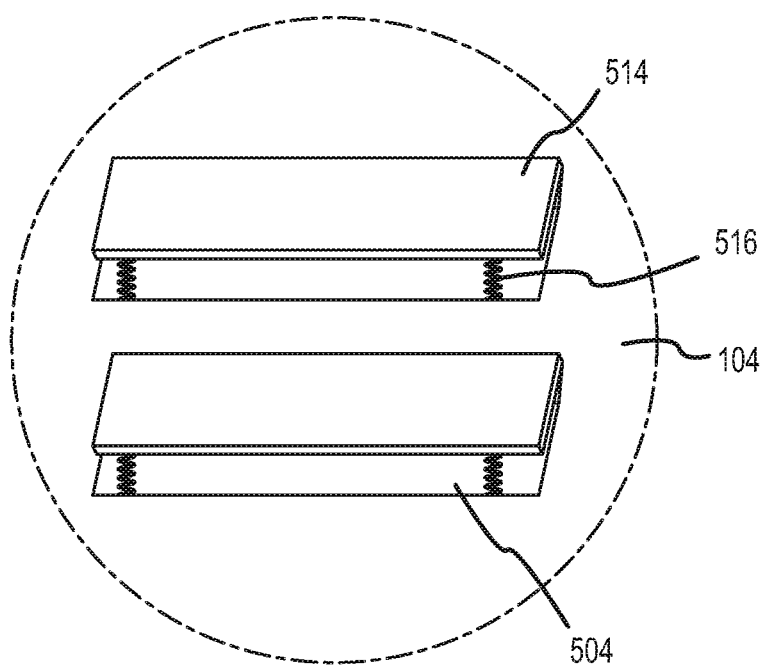
FIG. 8C is an enlarged view of the fourth embodiment of the protective mechanism of FIG. 8A in the activated position.

FIG. 8A is an isometric view of a fourth embodiment of the protective mechanism 512. FIG. 8B is a side elevation view of the protective mechanism 512 of FIG. 8A in an activated position. FIG. 8C is an enlarged front elevation view of the protective mechanism 512 in the activated position. The protective mechanism 512 may include lift members 514 or airfoils that may be extended out from an outer surface of the enclosure 104. The lift members 514 may be positioned along substantially any surface of the enclosure 104. For example, as shown in FIG. 8A, there may be lift members 514 positioned along a top of the front surface of the enclosure 104 and additionally or alternatively along vertically along a side of the front surface of the enclosure 104. For example, the lift members 514 may be positioned on the front, back, and/or sides of the enclosure 104.

There may be multiple lift members 514 or there may be a single lift member 514. The lift members 514 may be configured to be substantially flush with the enclosure 104 when in the non-activated or extend position. For example, the enclosure 104 may include depressions 504 for receiving the lift members 514. Then, when the lift members 514 are extended via extending members 516, they may be pushed out from the depressions 504 and may extend past the enclosure 104.

The lift members 514 may be substantially planar members that may be extended from the enclosure 104 at an angle or may be extended substantially straight outwards from the enclosure 104. The lift members 514 may be operably connected to the enclosure 104 along a first surface and a second surface, substantially parallel to the first surface may be free. In this example, the lift members 514 may rotate along the first surface to extend outwards from the enclosure. Referring to FIG. 8C, in one example, the lift members 514 may be secured along a top side and the bottom side of the lift members 514 may be unsecured. The lift members 514 may reduce the velocity of the device 100 when it is in freefall, as the lift members 514 may provide an upwards lift. For example, in the extended position, air may be trapped and push upwards against the bottom surface of the lift members 514, providing an upwards force (or force opposite of the freefall), thus reducing the velocity of the device 100.

The lift members 514 may be activated or extended by extending members 516. The extending members 516 may provide an upwards force on the bottom surface of the lift members 514 to substantially force each lift member 514 outwards. It should be noted that the lift members 514 may be activated individually or collectively. Additionally, the lift members 514 may be activated depending on the rotational axis of the device 100 during freefall. For example, there may be lift members 514 positioned on both a horizontal and vertical portion of the front surface of the enclosure 104. Depending on the angular momentum of the device 100 during freefall, either the vertically positioned lift members 514 or the horizontally positioned lift members 514 may be extended. However, if the device 100 is rotating during freefall along an angled rotation axis, then both sets of lift members 514 may be activated.

As discussed briefly above, the lift members 514 may be extended so that they may be slightly angled or may be substantially planar in the extended position. For example, as shown in FIG. 8C, the lift members 514 may be secured to the enclosure 104 at a top surface and then may extend outwards from the enclosure 104, so that they may be angled downwards from the top surface. The extending members 516 may function to extend the lift members 514 from their position within the depressions 504 and/or may support the lift members 514 in their extended position.

Figure 9:
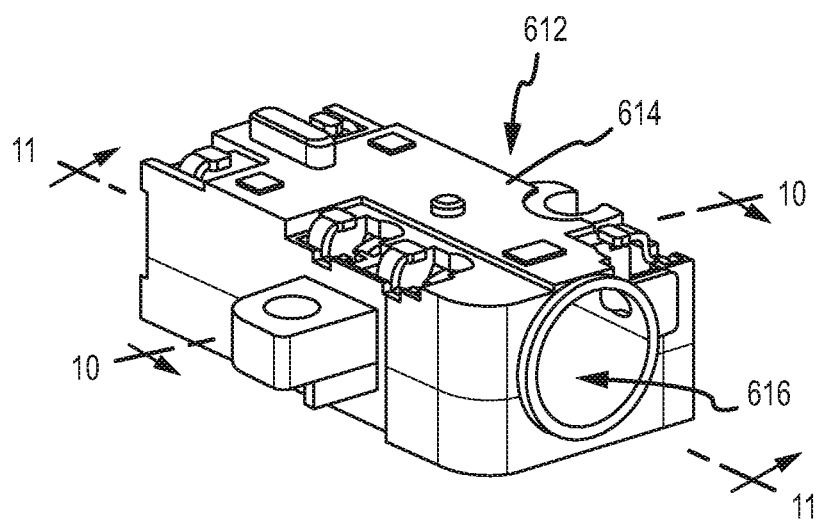
FIG. 9 is an isometric view of a port utilizing a fifth embodiment of a protective mechanism for the mobile electronic device.
Figure 10:
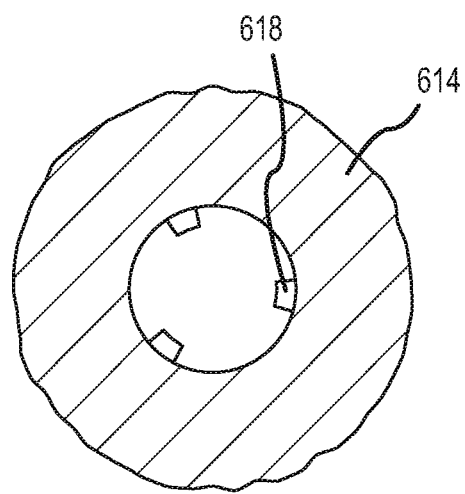
FIG. 10 is a cross-sectional view of the fifth embodiment of the protective mechanism of FIG. 9, viewed along line 10-10 in FIG. 9.

FIGS. 9 and 10 illustrate a fifth embodiment of the protective mechanism 612. In this embodiment, the protective mechanism 612 may act to grasp a plug that may be inserted into the device 100 when the device 100 enters freefall. For example, the protective mechanism 612 may form a portion of an audio port and if a headphone plug is inserted therein, the protective mechanism 612 may activate when the device 100 enters a freefall. Assuming that a user may be wearing the headphones, the device 100 may be prevented from continuing to freefall, may be paused mid-fall long enough to allow a user to attempt to catch the device 100, a user may grab the headphones to prevent the device 100 from impacting a surface.

Figure 11:
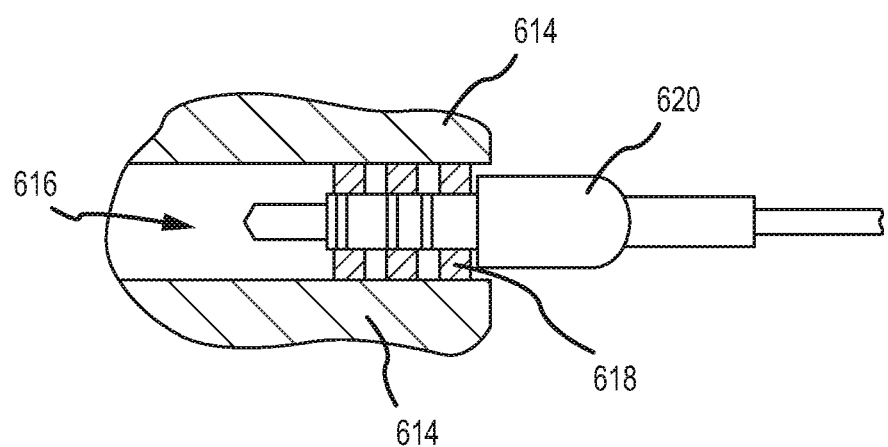
FIG. 11 is a cross-sectional view of the fifth embodiment of the protective mechanism of FIG. 9 with a plug received therein, viewed along line 11-11 in FIG. 10.

Referring now to FIGS. 9 and 10, the protective mechanism 612 may include a body 614 with a port 616 or aperture defined therein. The port 616 may be configured to receive a plug for headphones, speakers, a power cord, power charger, or the like. Grip members 618 may be disposed intermittently along an inner surface of the port 616. The grip members 618 may be configured to selectively grip the plug received within the port 616. For example, as shown FIG. 11, when the grip members 618 are activated they may operably connect to a plug 610 received within the port 616. The grip members 618 may substantially prevent the plug 610 from being removed from the port 616. The grip members 618 may include rings that may tighten around the plug 620, or may include prongs that extend to contact the outer surface of the plug 620, or other similar members. In another example, the grip members 618 may be electromagnets or other magnetic material that may be selectively activated. In this example, the plug 620 may include a corresponding magnetic material. Then, as the grip members 618 are activated, the magnetic force may be used to grip the plug 620.

When the device 100 enters freefall and the protective mechanism 612 is activated, the grip members 618 may grip the plug 620. In one example, the grip members 618 may extend from the inner surface of the port 616 to contact the plug 620 and in another example, the grip members 618 may be received around the plug 620 and may tightening around the plug 620. In these examples, the grip members 618 may substantially prevent the plug 620 from being removed from the port 616, for example, from the weight of the device 100 as it is being pulled downward during the freefall. As the plug 620 may be operably connected to headphones, speakers, or to another device (which may be substantially stable), the plug 620 may prevent the device 100 from continuing to freefall. For example a user may be wearing headphones that may be operably connected to his or her ears and when the device 100 falls and the grip members 618 are activated, the headphones (by virtue of their association with a user's ears) may prevent the device 100 from continuing to fall.

Figure 12A:
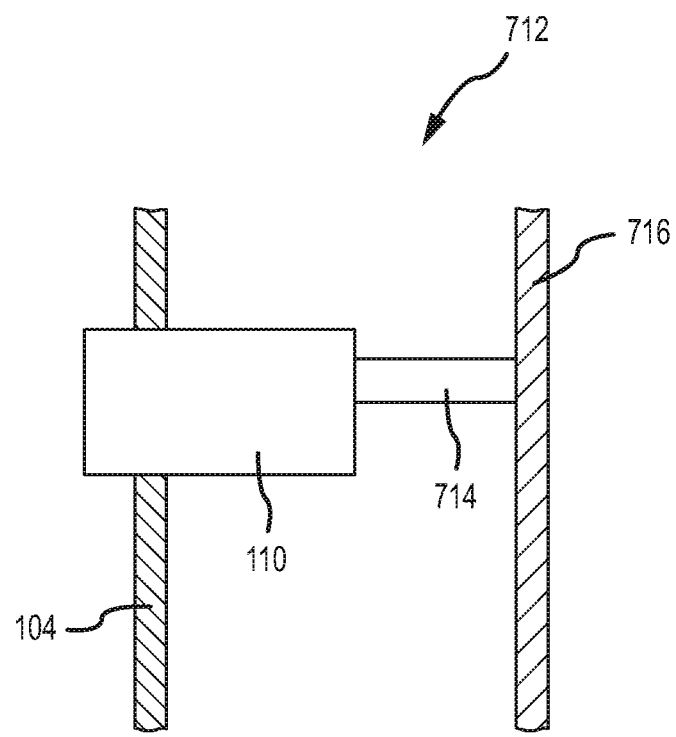
FIG. 12A is a partial cross-sectional view of sixth embodiment of a protective mechanism viewed along line 12A-12A in FIG. 1.
Figure 12B:
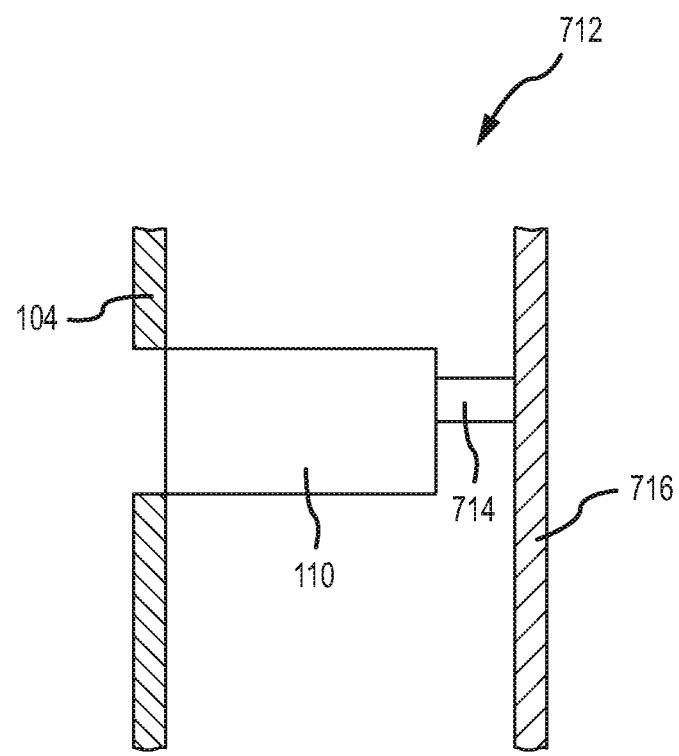
FIG. 12B is a partial cross-sectional view of the sixth embodiment of the protective mechanism in an activated position.

FIG. 12A and FIG. 12B illustrate a sixth embodiment of the protective mechanism 712. The protective mechanism 712 may include a retracting member 714 configured to move or displace in order to retract a member, such as button 110. The protective mechanism 712 may include a retracting member 714 operably connected to an anchor surface 716. The retracting member 714 is configured to selectively displace or change dimensions. For example, the retracting member 714 may be an electro active polymer that may retract based on a particular signal. The retracting member 714 is operably connected to the anchor surface 716, which may be an inner surface of the enclosure 104, or may be another component within the device 100. The other end of the retracting member 714 may be operably connected to a bottom surface of the button 110 or other component.

As the protective mechanism 712 is activated, the retracting member 714 may retract pulling the button 110 into the cavity defined within the enclosure 104. As shown in FIG. 12B, as the button 110 is retracted, the button may be positioned within the cavity of the enclosure 104, so that as the device 100 impacts a surface (e.g., due to a fall), the button 110 may not be substantially damaged. It should be noted that the retracting member 714 may be operably connected to components other than the button 110. For example, the retracting member 714 may be operably connected to the display screen 102, so that the display screen 102 may be retracted from an outer surface of the enclosure 104 and may be substantially protected from impact when the device 100 impacts a surface.

Figure 13A:
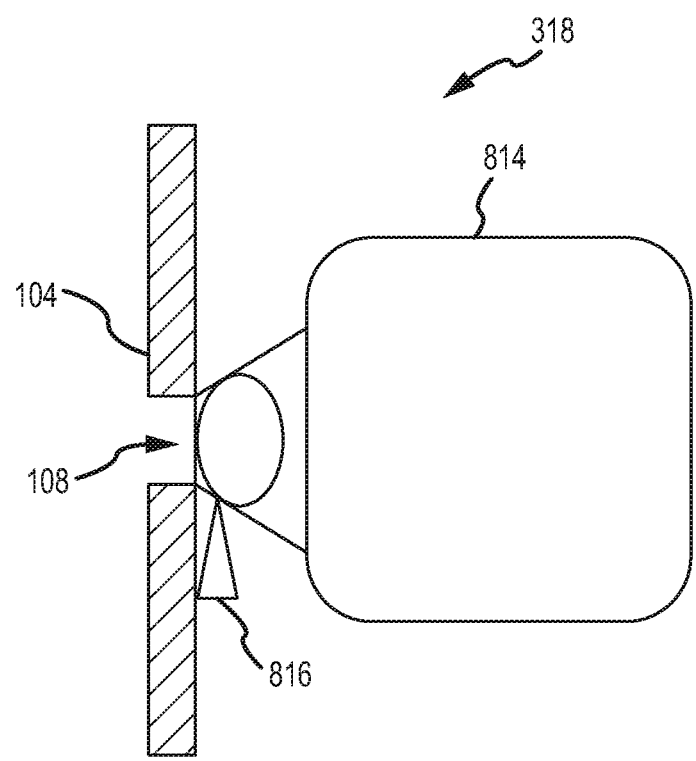
FIG. 13A is a partial cross-sectional view of a seventh embodiment of a protective mechanism taken along line 13A-13A in FIG. 1.

FIG. 13A is a perspective view of a seventh embodiment of the protective mechanism 318. The protective mechanism 318 may be configured to provide thrust or a force to counter act the force of the freefall (that is, gravity). In one example, the protective mechanism 318 may include a canister 814 and an activating member 816. The canister 814 may be configured to store a gas 818 (shown in FIG. 13B) that may be released from the canister 814 when the activating member 816 is activated.

Figure 13B:
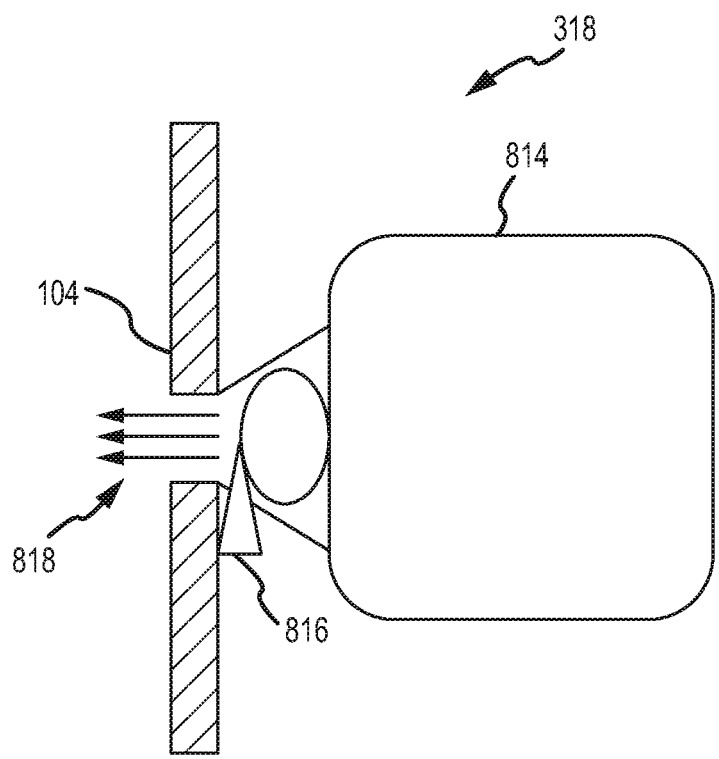
FIG. 13B is a partial cross-sectional view of the seventh embodiment shown in FIG. 13A with air being thrust out of an aperture.

Referring to FIGS. 1 and 13B, the activating member 816 may be selectively activated and may release the gas 818 from the canister 814. The canister 814 may be aligned with the port 108 defined on the device 100 (or other apertures within the enclosure 104). The gas 818 may be stored under pressure so that as it is released from the canister 814 it may provide a force or thrust for the device 100. The force from the gas 818 may be configured, for example, by its exit point on the enclosure 104 and/or the stored pressure, to help to counter act the force of gravity as the device 100 is in a freefall.

In another embodiment, the protective mechanism 318 may be used to "catch" the device before it makes impact. That is, the thrust mechanism 318 may be used to stop the device's descent and set it down slowly, return it to the user, or generate an air cushion between the device and an impact surface rather than varying the angular momentum. As mentioned above, the thrust mechanism may include a canister of compressed air, a cooling fan or dedicated fan, exhaust from a power source such as a fuel cell or turbine, or a dedicated system such as electric ion propulsion. In one implementation there could be one dedicated aperture and direction, allowing the angular momentum of the device to be changed along one axis. There could also be multiple apertures with either a dedicated propulsion system at each, or a method of redirecting the propulsive medium to the right points, such as a solenoid or variable apertures. A nozzle could be used to increase the exhaust velocity, or could be omitted.

It should be appreciated that the use of the thrust mechanism 318 in this manner may be in combination with one or more other angular momentum varying techniques. As such, the device may be configured to alter the orientation of the device during freefall via one or more of the other techniques described herein and the thrust mechanism 318 may engage immediately before impact to achieve a soft landing. In such embodiments, the gas may be thrust out apertures in the housing of the device located in areas that are not vulnerable. In other embodiments, the gas may be thrust out apertures located at or near (e.g., around the periphery of) the vulnerable areas of the device to protect them from a hard impact.

Figure 14:
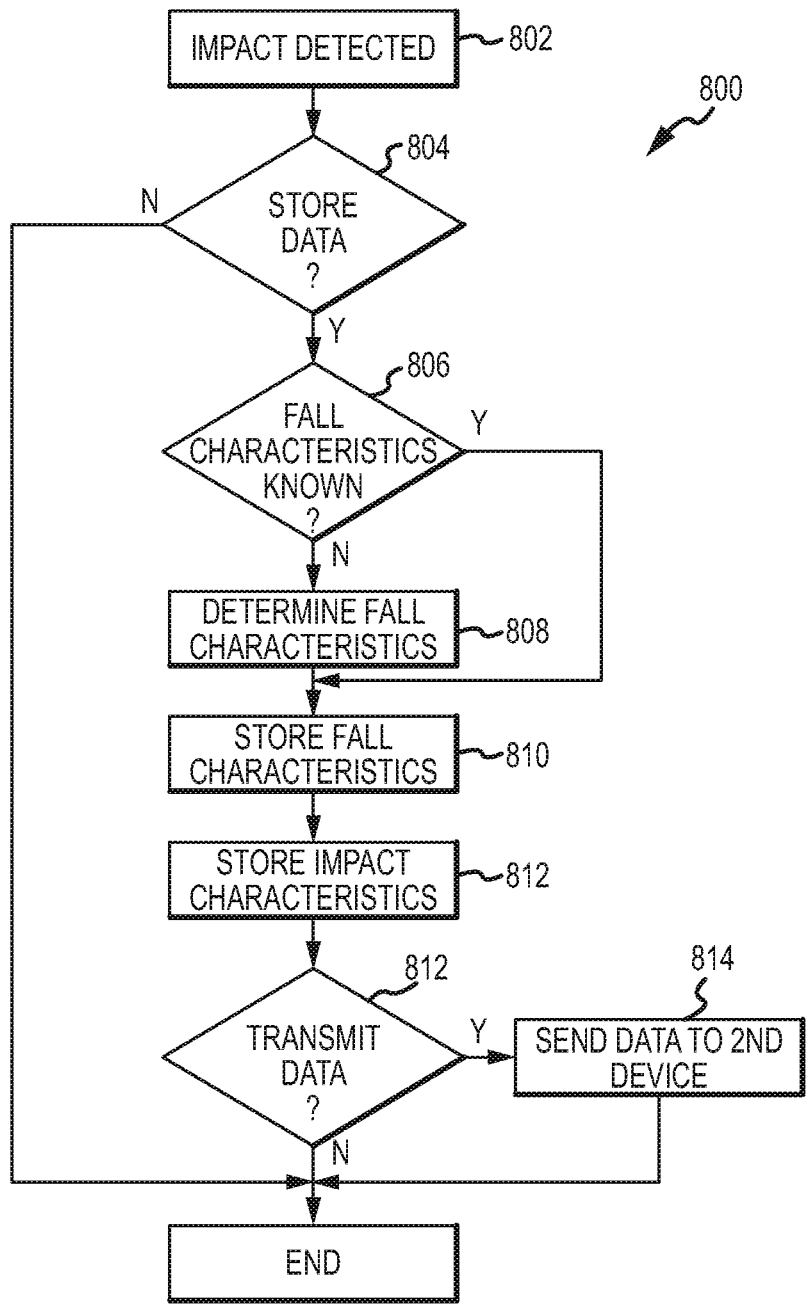
FIG. 14 is a flow chart illustrating an exemplary method for collecting fall and impact data for the electronic device.

In some implementations, the device 102 may store information such as fall and impact characteristics for a particular freefall and impact. FIG. 14 is a flow chart illustrating an exemplary method for collecting fall and impact data for the electronic device 102. The method 800 may begin with operation 802 and an impact may be detected. Operation 802 may be substantially the same as operation 272 in method 250. The impact detection may be at the end of a freefall as the device 102 encounters a surface. Once an impact is detected and provided that the device 102 is still at least partially operational, the method 800 may proceed to operation 804.

Operation 804 determines whether the device 102 should store data relating to the freefall and/or impact. The data may include fall characteristics, such as but not limited to, fall height, fall velocity, device orientation at the beginning of the fall, and/or angular momentum of the device 102 during the fall (which may be before and after a protective measure is activated). The data may also include impact characteristics, such as but not limited to, device 102 orientation at impact, velocity at impact, components experiencing the most force impact, and/or components most damaged at impact. If the data may not be stored, the method 800 may end. However, if in operation 804 the data may be stored, the method may proceed to operation 806.

Operation 806 determines if the fall characteristics are known. For example, the sensor 116 may have captured certain characteristics relating to the fall of the device 102, such as the velocity or angular momentum. However, other fall characteristics such as fall height or orientation of the device prior to the fall may not be known as they may not be directly captured by the sensor 116. If the desired fall characteristics are unknown, the method 800 may proceed to operation 808 and if the desired fall characteristics are known the method 800 may proceed to operation 810.

Operation 808 determines the desired unknown fall characteristics. The processor 124 may use data collected by the sensor 116 to compute the unknown characteristics. In one example, the processor 116 may be able to determine a fall height by using the freefall time along with the velocity to calculate the height that the device 102 fell. Similarly, the processor 124 may be able to determine the device 102 orientation at the beginning of the fall by using an impact orientation and the angular momentum of the device 102 during the fall (as captured by the sensor 116).

After operation 808 or after operation 806 (if the fall characteristics were known), the method 800 may proceed to operation 810. Operation 810 stores in the memory 120 the fall characteristics that were determined as well as those known. The actual fall characteristics that are stored may be varied depending on the desired information. Once the fall characteristics are stored, the method 800 may proceed to operation 812 and impact characteristics may be stored. It should be noted in that in some instances operation 810 and 812 may be completed simultaneously or in a single operation. As with the fall characteristics, the impact characteristics that are stored in the memory 120 may vary depending on the desired information and/or application of the data.

After operation 812, the method 800 may proceed to operation 812. Operation 812 determines if the data (fall characteristics and impact characteristics) may be transmitted. If the data is to be transmitted, the method 800 may proceed to operation 814 and the device 102 may transmit the data to a second device. The second device may be a computing device that may be used to store data from multiple devices so that in developing and fine tuning devices, the data may be used to develop and/or modify electronic devices. For example, if a trend in fall data is found by comparing the falls and impacts of multiple devices, certain areas of the device 102 may be created to be stronger, or the protective mechanism 112 may be modified to be better suited to protect the device 102 as the common fall characteristics may be known.

If the data is not transmitted to a second device, the method 800 may terminate. However, at the end of the method 800, the device 102 may include the fall characteristics and the impact characteristics stored within the memory 120. This information may assist the device 102 in activating the protective mechanism 112. For example, in the method 250 and operations 264 and 268, the estimations for the impact surface distance and the impact area of the device 102 may be more accurate by including common or high percentage distances and areas, respectively. In this example, the device 102 may refine the estimates of the fall height and/or impact area based on other previous falls or by falls from other devices. This may allow the protective measure 112 to be more accurate in order to prevent the device 102 from landing in a particular orientation. This is because certain unknown parameters for a particular fall may be estimated using data from pervious falls.

Figure 15:
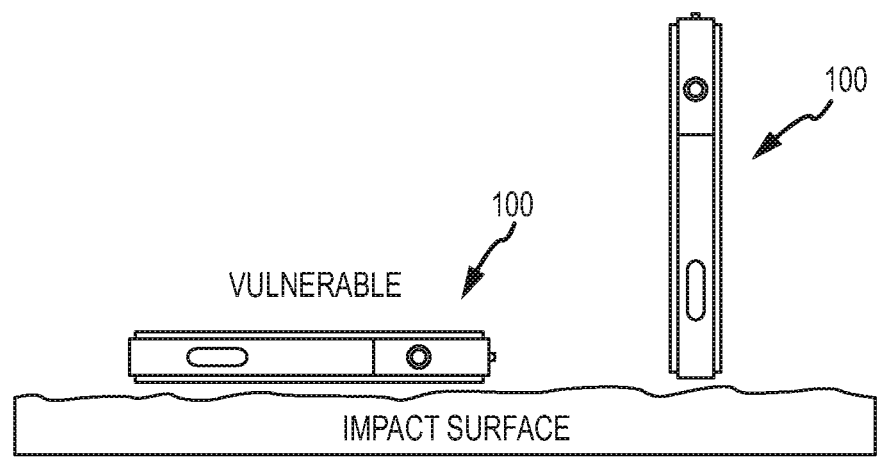
FIG. 15 illustrates the mobile device of FIG. 1 in a safe impact position and a vulnerable impact position.
Figure 16:
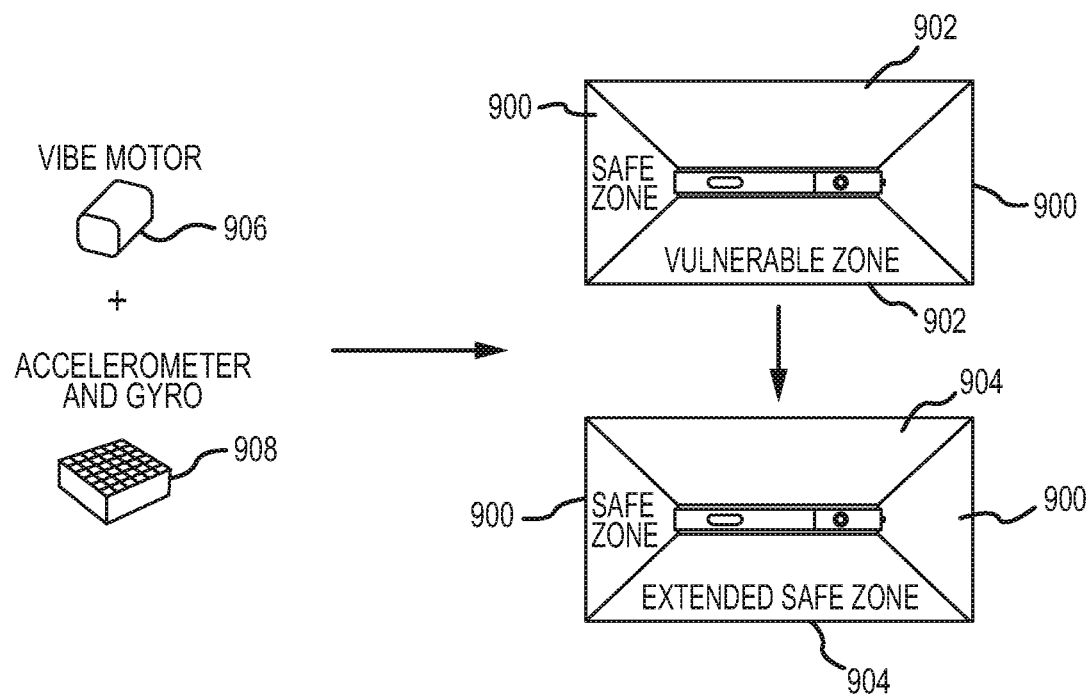
FIG. 16 illustrates safe and vulnerable zones of the device of FIG. 1.

FIG. 15 illustrates the device 100 of FIG. 1A along with sample vulnerable impact orientations and safe impact orientations. As discussed above, the vulnerable impact orientation may generally coincide with a cover glass of the device 100 impacting the surface, while the safe orientation may coincide with a metal or plastic portion of the device 100. FIG. 16 illustrates a safe zone 900 and a vulnerable zone 902 for the device 100 according to conventional devices having a large cover glass that is vulnerable to impact. Generally, if the device is dropped at an orientation that would result in the vulnerable zone making impact, there is a risk that the device may be damaged. However, implementing the present techniques, the safe zone may be extended to reduce or eliminate the vulnerable zone. That is, the extended safe zone 904, as created through implementation of the techniques herein, may eliminate or encompass the entirety of the vulnerable zone. The determination as to whether the device will make impact with either a safe zone or a vulnerable zone may be made initially upon sensing a drop event. Drop metrics such as orientation, height and rotation, for example, may be determined and utilized to determine whether the device will impact at a safe zone or not.

Generally, to achieve the extended safe zone 904, a vibration motor 906 may be implemented to alter the angular momentum of the device in freefall. A sensor 906, such as an accelerometer and gyroscope sensor, is also implemented. In some embodiments, separate accelerometer and gyroscope may be used and each may sense a single input. The vibration motor 906 may take the form of a vibrating device. As such, the vibration motor 906 may be operated to generate a haptic feedback for a user during normal operation of the device. In some embodiments, the vibration motor 906 may be a bi-directional motor to allow rotation of the mass in two directions. The bi-directional motor may provide increased ability to alter the orientation of the device during free fall, as the orientation may be adjusted in at least two different directions. In other embodiments, the vibration motor 906 may be a uni-directional motor, and may take a form similar to that of the motor 314 described above in FIG. 5A. The sensor 908 senses one or more characteristics of the device 100 such as its orientation, its acceleration and so forth. For example, if there is zero acceleration relative to gravity it may be determined that the device is in freefall.

Figure 17:
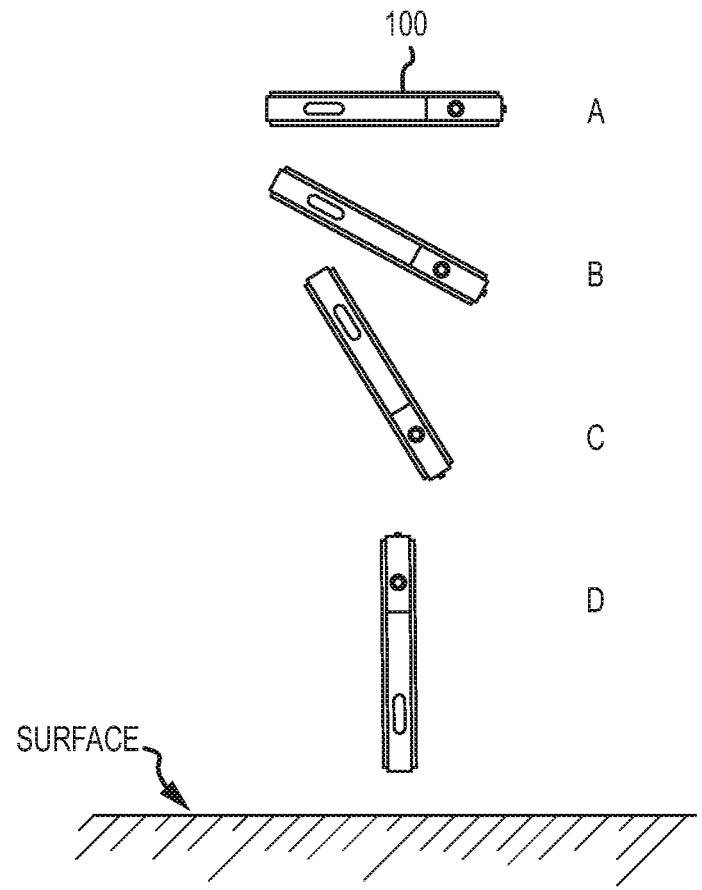
FIG. 17 illustrates changing orientation of the device of FIG. 1 so that impact is on a safe zone.

FIG. 17 illustrates an example drop event of the device 100 and different stages during the drop. As shown, the device is able to manipulate its orientation to change the area that will make impact. In particular, the device 100 re-orients itself from its first orientation A so that impact will be made at a safe zone in orientation D. The re-orientation occurs due to the conservation of momentum through operation of the motor 906.

Generally, the more angular momentum created by the motor, the larger the extended safe zone. As such, to achieve better responsiveness in altering the orientation of the device 100 during freefall, the vibration motor 906 may be larger than conventional motors in devices such as device 100. It should be appreciated that the effectiveness of the motor 906 in reorienting the device will depend not only on the size and weight of the motor, but also the size and weight of the device itself. In other embodiments, the motor may be substantially smaller.

Figure 18:
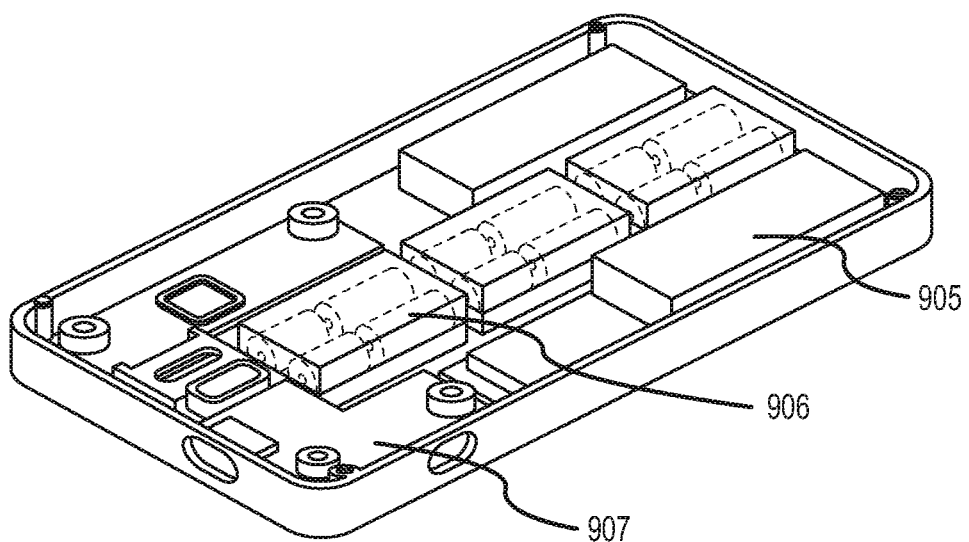
FIG. 18 illustrates the device of FIG. 1 with its cover glass removed to show a motor placement and orientation.

FIG. 18 illustrates the device 100 with the cover glass removed to show the positioning and orientation of the motor(s) 906 within the device. In some embodiments, multiple motors 906 may be implemented rather than a single motor. However, generally, there may be size and space constraints within the device that may limit the number and size of the motor. In multiple motor embodiments, the motors may be positioned in any suitable manner. In some embodiments, they may be aligned axially. Additionally, the motors may be configured to rotate together or independently. That is, they may be configured to rotate at the same speed and in the same direction or at different speeds and possibly different directions. Multiple motors may allow more precise control over varying the angular momentum by varying the rotational and or drive characteristics of the motors with respect to each other. Batteries 905 and control circuitry 907 are also illustrated. Generally, the motors 906 are positioned at or near the center of the device 100. Although the motors may be positioned anywhere within the device 100 and still alter the orientation of the device, positioning the motors 906 at the center of the device may significantly reduce the rotational moment of inertia of the device about a longitudinal axis of the device without having to make the device smaller. Any point of mass in the device will contribute to the rotational moment of the inertia proportionally to its density and the square of its distance from the rotational axis.

The rotational moment of inertia of the motor 906 could be increased by any suitable means including, but not limited to: adding mass to the rotating sections of the internal motor; adding mass to the eccentric weight (even if that mass is centered and doesn't contribute to the vibrating amplitude); and/or adding an additional mass to the drive shaft of the motor and the motor's rotor. In some embodiments, additional mass may only be engaged in a drop event. Clutches may be employed to decouple this mass from the drive shaft under normal use. Additionally, the motor 906 could be put into a short-term "turbo mode" during the drop event. The turbo mode may generally be an accelerated, overdriven mode having where the motor rotates a shaft a rate higher than normal. Prolonged use of the motor 906 in the turbo mode may prematurely wear out the motor but such wear would not generally be of concern during a ~0.5 second fall, or a fall of typical duration. Additional motors could be added with the sole purpose of controlling impact angle, as shown in FIG. 18.

Additionally, the motors 906 may be mounted so that their rotational axis is parallel with the longitudinal axis of the device 100. This allows for a maximum controllable angle to be achieved as the controllable angle depends on a ratio of the motor's rotational moment of inertia to the device's rotational moment of inertial about the parallel axis. In some embodiments, the controllable angle is approximately +/−16 degrees.

Figure 19:
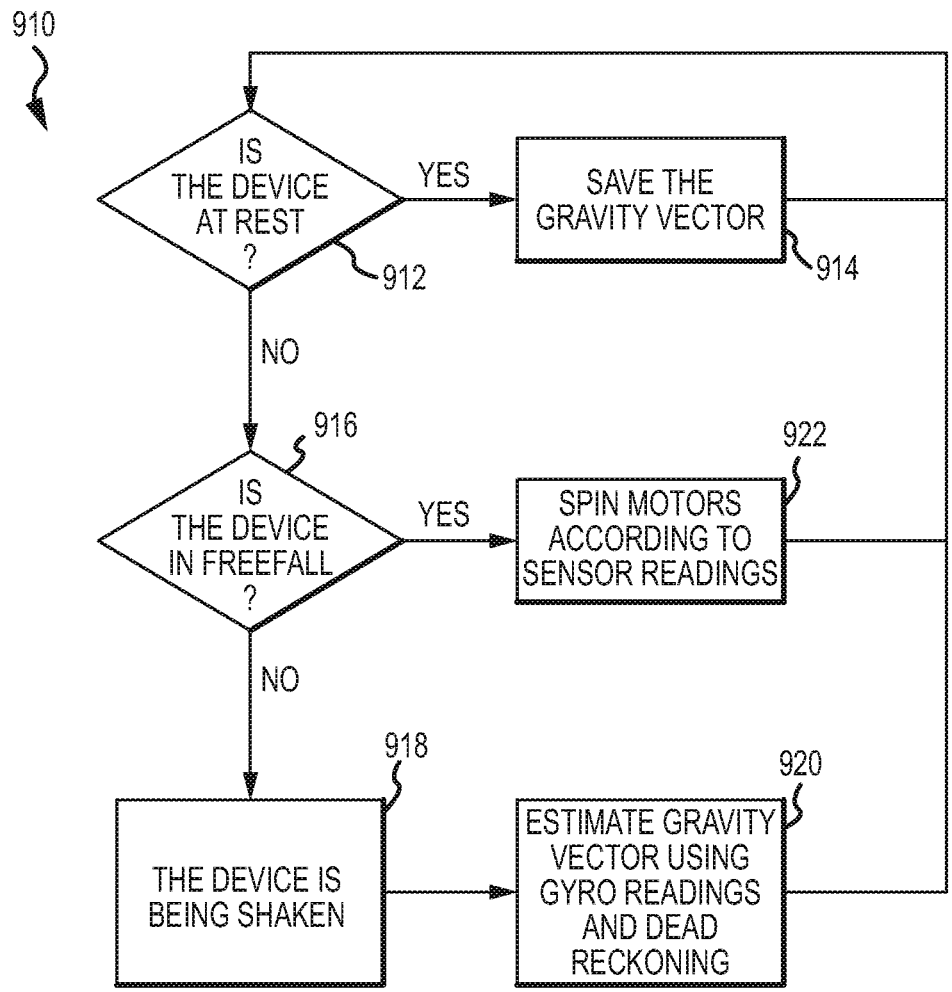
FIG. 19 is a flowchart illustrating a method of operation for the device of FIG. 1.

FIG. 19 is a flow-chart illustrating an example method 910 for operating the device 100. Initially, it is determined whether the device 100 is at rest (Block 912). If the device 100 is at rest, the gravity vector is saved (Block 914). The gravity vector may be obtained by the sensor 908 (e.g., accelerometer). If the device is not at rest, the device 100 determines if it is in freefall (Block 916). If the device is not in freefall, it may be determined that the device is being shaken or otherwise moved deliberately or coincidentally (Block 918). The gravity vector may be estimated using the sensor (e.g., gyroscope) and dead reckoning (Block 920) and saved. If, however, the device is determined to be in freefall, the motor 906 may be spun (Block 922). As may be appreciated, the spinning of the motor 906 may be executed based on need. That is, the motor may spin to re-orient the device to a safe impact zone based on readings obtained from the sensors which allow for an orientation of the device to be determined.

False positives in method 910 may be mitigated through additional steps that are not shown. In particular, the device 100 may be configured to determine if the device has been tossed, as many users may toss the device to another user or onto a safe surface (e.g., a soft surface such as a pillow or bed) and re-orientation of the device may be unnecessary. The toss determination may be made based at least in part upon historical gyroscopic data in combination with the accelerometer data. This data may generally indicate the movement of the device as being a parabolic arc in nature (e.g., gentle movement upward and laterally before moving downward). However, if at any point during the downward movement, after a toss has been determined, there is an impact (such as would result if the device bounced off a surface, is caught and then dropped by an individual, or bumped), the system may reset and again determine if the device is in a freefall state (Block 916). The method 910 then proceeds. Thus, even when a toss event is detected, the freefall and impact protection techniques may still be activated in case the toss ultimately results in the device falling.

Figure 20:
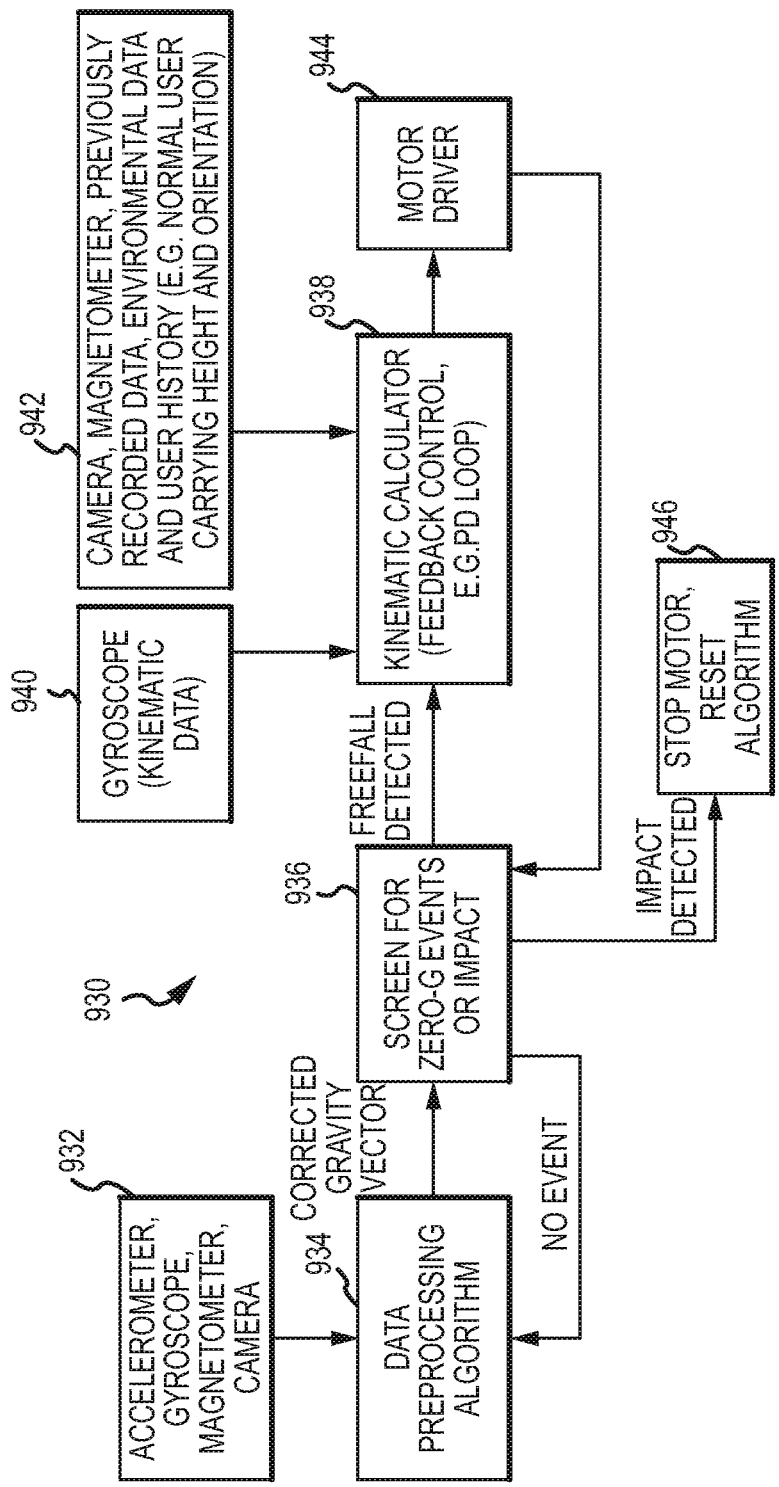
FIG. 20 is flowchart illustrating another method of operation for the device of FIG. 1.

Turning to FIG. 20, is another flowchart illustrating another method 930. The method 930 includes initially feeding data into a preprocessing algorithm (Blocks 932 and 934). Specifically, accelerometer, gyroscope, magnetometer and camera data is provided to a preprocessing algorithm. Each of the input data may singularly or combinatorially contribute information that allows the algorithm to make a determination or estimation of a gravity vector. If the device is at rest, data provided from the accelerometer may solely be used to determine the gravity vector. As such, it should be appreciated that one or more of the devices may not be utilized in each embodiment. That is, for example, some embodiments may exclude data from at least one of the camera, the magnetometer, the gyroscope or the accelerometer.

A corrected gravity vector is thus determined and screened for zero-g events or impact (Block 936). If a zero-g event is detected, it may indicate a freefall of the device or a drop event. A kinematic calculator is then engaged (Block 938). Generally, the kinematic calculator may take the form of a feedback control loop configured to determine the orientation of the device and help to re-orient the device to achieve a non-damaging impact. The kinematic calculator may receive as input gyroscopic or kinematic data (Block 940) as well as data from the camera, magnetometer, previously recorded data, environmental data and user history (e.g., normal user carrying height and orientation) (Block 942). Based on this information, the kinematic calculator may drive the motor (Block 944) to properly re-orient the device. Once the motor has been driven, the method 930 again screens for zero-g events or impact (Block 936). If the device remains in the zero-g event, the kinematic calculator is re-run. The kinematic calculator may thus check to see if the orientation and/or of the device is correct so that a safe zone will make impact and if not, may drive the motor to either stop rotation, reverse rotation or accelerate rotation of the device. Alternatively, if an impact is detected, the motor is stopped and the algorithm is reset (Block 946).

The initial orientation and height of the device can be used for "dead reckoning" control of the impact angle. The motor speed can be detected (as it can vary over the life of the product or from part to part, and integrated to determine change in angular position of the device, the gyroscope data can also be integrated to continuously track orientation, to make sure the processor always knows the device's orientation. The gyroscope may be useful if a user fumbles the device are dropping it.

The kinematic calculator may take any suitable form and any feedback loop can be used including but not limited to a proportional integral derivative (PID) controller. Generally, a PID controller consists of three distinct parts which heuristically determine present error, past error, and predicted future error. The proportional term spins the motor in proportion the current distance from its position to the ideal angle of impact orientation, while a derivative term changes the motor's speed based on the expected future position of the device to minimize how much the device overshoots its angular position target. An integral term may help eliminate steady state error, which is less useful in a drop of a small finite interval, but could still be used. That is, as a drop event may typically only last a fraction of a second, the accumulation of past errors may not generally be utilized. As such, in some embodiments, the kinematic calculator may take the form of a PD controller, as the integral term may be ignored. In other embodiments, both the integral and derivative terms may be ignored, resulting in a proportional P controller.

The PID controller may generally be configured to determine how to operate the motor effectively to achieve steady state operation. That is, the PID controller may be configured to prevent over and/or under rotating the device. As such, in some embodiments it may be configured to determine and track the effectiveness of the motor on the device (e.g., how effective was operation of the motor for reorienting the device presently). Alternatively, gyroscopic feedback may be used to determine how well the motor reoriented the device. Additionally, the PID controller may control operation of the motor in a predictive manner. The PID controller may be configured to brake the motor and/or reverse the direction in which the motor spins in bi-directional motors. Reversing the motor may alter the angular momentum in the opposite fashion, thereby maintaining an orientation of the device with respect to ground, slowing over-rotation and/or reversing the direction of rotation.

A determination is made as to an expect orientation at impact. Based on an expect impact orientation, the kinematic controller decides if the vibrator should be activated, at what speed, and in which direction. Some of the inputs that may be used by the algorithm include, but are not limited to: freefall state of the device; orientation of the device; orientation of the device relative to magnetic north; distance of the device to the ground; orientation of the device relative to the ground; location of the device; location of the sun; time; orientation of the device relative to the environment; rotational velocity of the device; distance to the ground and so forth. Sensors that may provide these inputs may include: an accelerometer; a gyroscope; a magnetometer; a speaker; a microphone; one or more cameras; a GPS device; and a clock or timer. In some embodiments, the height of the drop may be determined from a lookup table.

The inputs to the kinematic calculator may be used to determine various different fall and/or orientation related metrics. For example, the speakerphone element and microphone(s) can be used to determine the device's distance to a hard flat plane, in this case the ground. The magnetometer can be used to determine magnetic north when away from interference. Magnetic north will be a vector in a plane approximately horizontal to the ground. A single camera can be used for monovision depth perception, by taking video and tracking features (e.g. the pattern of a granite floor) as they move in the camera's pixel XY space. The accelerometer data can be integrated twice to determine change in position per time interval, and the change in distance between those features on the camera pixels can then be used to calculate the distance to those features. Two cameras or a camera and projector can be used similarly for stereovision depth perception and object tracking.

The control scheme can also determine the path of the device prior to drop. For example, a smooth arc would indicate a "toss" and not initiate the drop algorithm, while a high accelerometer reading (bump or jolt), or initial velocity below horizontal (toward the ground) would indicate a drop.

In some embodiments, the vibrator control algorithm might output a timestamp including all of its inputs, which can later be read. The unit can also record number of drops, to determine if a user repeatedly drops a device, from what heights and in what orientation. Drop height can be confirmed after the event using the time between freefall start and the impact with the ground, as measured by the accelerometer.

Generally, the higher the drop height, the more influence the motor and the kinematic controller can have on the impact angle (i.e., the higher the controllable angle). This is actually convenient, because higher height drop events generally have higher potential for damage (e.g., cover glass breakage) if the unit lands in a vulnerable orientation. FIG. 20 is a chart illustrating the effectiveness of operating the motor to orient the device a safe impact area. The angle of impact θ is measured from the plane of the device when impacting directly on a safe zone (e.g., a metal or plastic portion of the device, not the cover glass).

The foregoing description has broad application. For example, while examples disclosed herein may focus on changing an orientation of a device prior to impacting a surface, it should be appreciated that the concepts disclosed herein may equally apply to modifying the device orientation during other situations. Similarly, although the protective mechanism may be discussed with respect mobile electronic device, the devices and techniques disclosed herein are equally applicable to other types of devices. Accordingly, the discussion of any embodiment is meant only to be exemplary and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

What is claimed is:

1. A mobile personal electronic device comprising:
   a processor;
   at least one sensor in communication with the processor, wherein the processor is configured to determine an orientation of the mobile personal electronic device and a drop event based on input from the at least one sensor;

a motor in communication with the processor, wherein the processor is configured to drive the motor when the drop event is determined; and a mass operably connected to the motor and configured to rotate with respect to the mobile personal electronic device to alter the orientation of the mobile personal electronic device; wherein an additional mass is configured to engage a rotating section of the motor using a clutch upon detection of the drop event; and the additional mass is disengaged from the rotating section using the clutch when the drop event is not detected.

2. The mobile personal electronic device of claim 1, wherein the at least one sensor comprises at least one of: an accelerometer, a gyroscope, a camera, a microphone, and a magnetometer.

3. The mobile personal electronic device of claim 1, further comprising a feedback loop wherein the feedback loop provides input to the processor, the processor being configured to:

determine a result of driving the motor; and upon determining the result selecting an appropriate response.

4. The mobile personal electronic device of claim 3, wherein the feedback loop comprises a Proportional-Integral Derivative controller.

5. The mobile personal electronic device of claim 3, wherein the feedback loop comprises a Proportional-Derivative controller.

6. The mobile personal electronic device of claim 3, wherein the feedback loop comprises a Proportional controller.

7. The mobile personal electronic device of claim 3, wherein the motor is driven again in response to the feedback loop.

8. The mobile personal electronic device of claim 3, wherein the motor is driven in an opposite direction in response to the feedback loop.

9. The mobile personal electronic device of claim 3, wherein the motor is driven at a higher rate in response to the feedback loop.

10. The mobile personal electronic device of claim 1, wherein the mass is located at or near the center of the mobile personal electronic device.

11. The mobile personal electronic device of claim 1, wherein:

the motor is configured to operate at a first rate during normal operation; and the motor is configured to operate at a second rate during the drop event, wherein the second rate is higher than the first rate.

12. The mobile personal electronic device of claim 1 further comprising one or more additional motors configured to operate during the drop event.

13. The mobile personal electronic device of claim 1, wherein a rotational axis of the mass is parallel with a longitudinal axis of the mobile personal electronic device.

14. The mobile personal electronic device of claim 1, further comprising a propulsion system configured to provide thrust to alter the orientation of the mobile personal electronic device during the drop event, wherein the propulsion system is operated in addition to or instead of the motor.

15. The mobile personal electronic device of claim 14, wherein the propulsion system comprises at least one of: a cooling fan, a compressed air canister, a turbine and a nozzle.

16. The mobile personal electronic device of claim 1, further comprising a propulsion system configured to provide thrust to change acceleration of the mobile personal electronic device prior to impact of the mobile personal electronic device after the drop event, wherein the propulsion system is utilized in addition to or instead of the motor.

17. The mobile personal electronic device of claim 1, wherein the mass rotates with respect to the mobile personal electronic device to alter the orientation of the mobile personal electronic device so that a first zone of the mobile personal electronic device impacts a surface when the mobile personal electronic device is operating in a first mode and that a second zone of the mobile personal electronic device impacts the surface when the mobile personal electronic device is operating in a second mode.

18. The mobile personal electronic device of claim 17, wherein the mobile personal electronic device operates in the first mode when a case is not attached to the mobile personal electronic device and in the second mode when the case is attached to the mobile personal electronic device.

19. The mobile personal electronic device of claim 1, wherein the additional mass is configured to:

rotate when the drop event is detected; and not rotate when the drop event is not detected.

20. A method of protecting a mobile personal electronic device during a freefall comprising the steps of:

detecting by a sensor the freefall of the mobile personal electronic device;

determining by the sensor an orientation of the mobile personal electronic device;

determining an orientation of the mobile personal electronic device that would avoid impact at a vulnerable area of the mobile personal electronic device;

operating a motor to alter an angular momentum of the mobile personal electronic device during the freefall to change the orientation of the mobile personal electronic device towards the orientation that would avoid impact at the vulnerable area;

coupling an additional mass to a rotating section of the motor using a clutch upon detection of the freefall; and decoupling the additional mass from the rotating section using the clutch when the freefall is not detected;

monitoring the effect of the motor's operation; and providing a feedback loop to adjust the operation of the motor based on the monitoring step.

21. The method of claim 20, wherein the feedback loop comprises a Proportional-Integral Derivative controller.

22. The method of claim 21, wherein an integral step of the Proportional-Integral Derivative controller is not performed.

23. The method of claim 21, wherein an integral step and a derivative step of the Proportional-Integral Derivative controller are not performed.

24. The method of claim 20 further comprising determining one or more metrics selected from:

an orientation of the mobile personal electronic device relative to the magnetic north pole;

a distance of the mobile personal electronic device from an impact surface;

an orientation of the mobile personal electronic device relative to the impact surface;

an orientation of the mobile personal electronic device relative to an environment; and a rotational velocity of the mobile personal electronic device.

25. The method of claim 20 comprising:

operating the motor at a first rate during normal operation; and operating the motor at a second rate during the freefall, wherein the second rate is higher than the first rate.

26. The method of claim 20, further comprising storing in memory at least one fall characteristic.

27. The method of claim 26, further comprising storing in the memory at least one impact characteristic.

28. The method of claim 20, further comprising expulsing a fluid prior to impact to slow a fall rate of the mobile personal electronic device.

29. The method of claim 20, further comprising expulsing a fluid to alter the orientation of the mobile personal electronic device.

30. The method of claim 20, wherein the vulnerable area corresponds to a first area when a case is not attached to the mobile personal electronic device and to a second area when the case is attached to the mobile personal electronic device.

31. The method of claim 30, wherein the first area comprises a side of the mobile personal electronic device and the second area comprises a display of the mobile personal electronic device.

32. The method of claim 31, wherein the motor is not operated if a determined path of the mobile personal electronic device indicates the mobile personal electronic device has been tossed.

33. The method of claim 32, wherein the motor is operated after a bump event subsequent to the determination that the mobile personal electronic device has been tossed.

34. The method of claim 20, further comprising:
   rotating the additional mass when the freefall is detected; and
   not rotating the additional mass when the freefall is not detected.

* * * * *